US012503267B2

(12) United States Patent
Wang

(10) Patent No.: US 12,503,267 B2
(45) Date of Patent: Dec. 23, 2025

(54) STICKER DISPENSER

(71) Applicant: Shenzhen Xiaoguan Technology Co., Ltd., Shenzhen (CN)

(72) Inventor: Tianlong Wang, Shenzhen (CN)

(73) Assignee: Shenzhen Xiaoguan Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/220,292

(22) Filed: May 28, 2025

(65) Prior Publication Data

US 2025/0282515 A1 Sep. 11, 2025

Related U.S. Application Data

(63) Continuation-in-part of application No. 18/641,685, filed on Apr. 22, 2024, now Pat. No. 12,358,678.

(30) Foreign Application Priority Data

Jan. 11, 2024 (CN) ......................... 202420070955.3
Jan. 23, 2025 (CN) ......................... 202520161011.1

(51) Int. Cl.
*B65H 16/00* (2006.01)
*B65C 9/00* (2006.01)
*B65H 35/00* (2006.01)

(52) U.S. Cl.
CPC ......... *B65C 9/0006* (2013.01); *B65H 16/005* (2013.01); *B65H 35/002* (2013.01); *B65C 2201/00* (2013.01); *B65C 2210/00* (2013.01); *B65H 2601/325* (2013.01); *B65H 2701/194* (2013.01)

(58) Field of Classification Search
CPC ............................ B65H 37/002; B65H 37/005
See application file for complete search history.

(56) References Cited

U.S. PATENT DOCUMENTS 4,954,210 A * 9/1990 Desmond ................ B65C 11/00 156/719
5,851,347 A * 12/1998 Rodriguez ........... B65H 37/005 225/41
6,394,165 B1 * 5/2002 Rader .................. B65H 37/005 156/577
2005/0126692 A1 * 6/2005 Hajny .................. B65H 37/002 156/539

* cited by examiner

*Primary Examiner* — Alex B Efta
(74) *Attorney, Agent, or Firm* — WPAT, PC

(57) ABSTRACT

A sticker dispenser with sticker roll carrier for dispensing stickers, wherein the stickers are peelably adhered to liner paper and wound into a sticker roll. The sticker dispenser with a sticker roll carrier includes a housing having a first chamber with an opening, a sticker roll carrier assembled in the first chamber and configured to carry the sticker rolls, and a cover detachably connected to the housing to cover the opening of the first chamber, thereby retaining the sticker roll carrier within the first chamber. The present disclosure enables direct cartridge replacement upon depletion of the sticker rolls, thereby significantly facilitating the sticker roll replacement operation for users.

14 Claims, 24 Drawing Sheets

STICKER DISPENSER

BACKGROUND

Technical Field

The present disclosure relates to a technical field of sticker dispensing, and more specifically to a sticker dispenser.

Related Art

Stickers are sheets that can be attached to other items. The stickers can be printed with barcodes, QR codes, or various symbols or patterns, to be used for information recording, stickering, or entertainment. Commonly, a commercially available sticker is peelably attached onto a liner paper, and a user can manually bend the liner paper such that an edge of the sticker opens up a small opening from the liner paper, whereby the sticker can be removed. This conventional method of peeling off the sticker is inconvenient, in which the liner paper may be wrinkle, and the sticker or liner paper may be torn.

Based on this, the Applicant has developed a sticker dispenser, such as published Chinese patents No. CN219970240U and CN219750321U, which realizes automatic peeling off of stickers by driving a sticker roll to rotate by means of a motor and changing conveying directions of the liner paper and the sticker at a position close to an output port. These technical solutions proposed by the Applicant overcome the above problems existing in the related art. However, the above technical solutions are adopted with a motor to drive the sticker roll to rotate, requiring the use of electrical components such as motor, circuit board, battery, etc., which is costly and requires charging or replacing the battery after a long-term use.

SUMMARY

However, the vocabulary expression of the present disclosure is only used to describe some embodiments (whether or not already in the claims) disclosed in this specification, rather than a complete description of all possible embodiments.

In order to solve the problems existing in the prior art, the present disclosure provides a sticker dispenser with a sticker roll carrier, wherein a detachable sticker cartridge is preloaded with sticker rolls by the manufacturer. This configuration enables direct sticker cartridge replacement upon depletion of the sticker rolls, thereby significantly facilitating the sticker roll replacement operation for users.

In order to achieve the above objectives, the technical solutions adopted in the present disclosure are as follows.

A sticker dispenser with a sticker roll carrier for dispensing stickers, wherein the stickers are peelably affixed to liner paper and wound into sticker rolls each having a central positioning hole. The sticker dispenser with a sticker roll carrier comprises a housing including a first chamber with an opening, a sticker roll carrier configured to carry the sticker rolls and assembled in the first chamber; and a cover detachably connected to the housing to cover the opening of the first chamber, thereby retaining the sticker roll carrier within the first chamber.

In some embodiments, the sticker roll carrier comprises an upper plate and a lower plate arranged opposite to each other, with a sleeve column and a winding shaft disposed between the upper and lower plates. The sleeve column is configured for mounting the sticker rolls thereon, while the winding shaft is adapted to wind the liner paper after sticker separation.

In some embodiments, the sticker roll carrier further comprises a sticker conveying section and a turn-peeling portion disposed between the upper plate and lower plate. The sticker conveying section is arranged between the sleeve column and the turn-peeling portion to transport stickers toward the turn-peeling portion. The turn-peeling portion is positioned between the sticker conveying section and the winding shaft, configured to divert the liner paper in a direction different from the sticker's travel path, thereby enabling separation of the stickers from the liner paper.

In some embodiments, the upper plate and lower plate are discrete components, with at least one of the sleeve column, sticker conveying section, and turn-peeling portion being integrally formed with the lower plate.

Preferably, at least one of the sleeve column, sticker conveying section, and turn-peeling portion is provided with snap hooks, snap grooves, positioning protrusions, or positioning recesses, while the upper plate is provided with mating parts configured to engage or interlock with the snap hooks, snap grooves, positioning protrusions, or positioning recesses.

In some embodiments, the edges between the upper plate and lower plate are arranged in an open configuration, wherein the sticker rolls sleeved on the sleeve column are constrained by the inner sidewall of the first chamber within the housing to prevent unwinding.

In some embodiments, the winding shaft and the housing are equipped with a coupling mechanism that cooperates with each other. The coupling mechanism includes a protruding shaft disposed on one of the winding shaft or the housing, and a corresponding shaft sleeve disposed on the other. Wherein the protruding shaft or the shaft sleeve disposed on one of the winding shaft is connected to the winding shaft through a snap-fit fastener.

In some embodiments, the sleeve column is a hollow column, and the housing includes a positioning post inserted into the sleeve column. The positioning post has an operation button disposed thereon and a snap-fit component operated by the operation button. The cover is provided with a through hole for exposing the operation button and a snap-fit mating component engaged with the snap-fit component.

In some embodiments, the housing includes an insertion positioning portion and a snap-fixing portion respectively disposed at opposite edges of the opening. The cover is correspondingly provided with an insertion mating portion and an clastic snap-fit portion, wherein the cover is connected to the housing by means of the insertion mating portion engaging with the insertion positioning portion, and the clastic snap-fit portion elastically snapping onto the snap-fixing portion.

In some embodiments, the housing includes an outer shell and a base shell. The outer shell includes a peripheral side wall and a partition wall disposed between upper and lower edges of the peripheral side wall, thereby defining the first chamber above the partition wall and a second chamber below the partition wall. The second chamber accommodates a driving mechanism for rotating the winding shaft, while the base shell covers the lower edge of the peripheral side wall.

In some embodiments, the driving mechanism is a manual driving mechanism comprising an operating member configured to operatively reciprocate within a set range, and a transmitting mechanism transmission-connected to both the operating member and the winding shaft, capable of transmitting power output from the operating member to the winding shaft to drive rotation thereof. The transmitting mechanism includes a one-way clutching device, which couples to transmit power when the operating member moves in a first direction, and separates to disconnect the power transmission when the operating member moves in a second direction opposite to the first direction.

In some embodiments, the transmitting mechanism is a gear train transmitting mechanism comprising a plurality of intermeshing gears. The one-way clutching device includes a movable gear configured to be movable between a coupled position and a detached position, and a force-applying member configured to apply a resilient force to the movable gear in a direction maintaining the movable gear in the coupled position. During movement of the operating member in the second direction, the movable gear is capable of overcoming the resilient force to move from the coupled position to the detached position.

In some embodiments, the transmitting mechanism is a gear train transmitting mechanism comprising a plurality of intermeshing gears. The one-way clutching device includes a movable gear configured to be movable between a coupled position and a detached position; and a force-applying member configured to apply a resilient force to the movable gear in a direction maintaining the movable gear in the coupled position. During movement of the operating member in the first direction, the movable gear is capable of overcoming the resilient force to move from the detached position to the coupled position.

Preferably, at least one wall of the second chamber includes a guide slot configured to guide the movement path of the movable gear as it transitions between the coupled position and the detached position.

Preferably, guide slots are disposed on both opposing walls of the second chamber, and adapted to the ends of the gear shaft of the movable gear.

Preferably, the force-applying member is a torsion spring or resilient sheet having a resilient arm that abuts against the movable gear to exert the resilient force.

In some embodiments, the transmitting mechanism includes an actuating gear disposed upstream of and remaining coupled to the movable gear in a transmission direction of the power, and a driven gear disposed downstream of and detachably coupled to the movable gear in the transmission direction of the power. In condition of the operating member moving in the second direction, the actuating gear acts on the movable gear in a direction such that the movable gear is separated from the driven gear.

Preferably, the operating member comprises a rack portion, and the transmitting mechanism includes a first gear coupled to the rack portion. The first gear and the actuating gear are coaxially disposed, with the actuating gear having a diameter D that is more than double a diameter d of the first gear.

Preferably, the driven gear is fixedly connected to the winding shaft.

Preferably, the operating member is attached with a reset spring configured to apply a force to the operating member in a direction causing movement in the second direction.

Preferably, the operating member is configured to pivot around a set axis.

Preferably, the one-way clutching device is a one-way bearing that is coupled to a transmitting gear within the transmitting mechanism.

In some embodiments, the driving mechanism is an electric driving mechanism including an electric motor configured to output rotational power and being transmission-connected to the winding shaft. The electric motor is at least partially disposed within the first chamber and adapted to extend through the central positioning hole of the sticker roll.

Preferably, the housing comprises an extension shell protruding into the first chamber, wherein at least a portion of the electric motor is disposed within said extension shell.

Preferably, the extension shell is configured to extend through the central positioning hole, thereby positioning the sticker roll.

Preferably, the extension shell is provided with an accommodation configured to form a pickup space between itself and the wall surface of the central positioning hole, wherein the sticker roll is adapted to be grasped and removed from the pickup space.

Preferably, the electric motor is provided with a positioning portion corresponding to the accommodation, wherein the positioning portion engages with the accommodation to circumferentially fix the electric motor relative to the extension shell.

Preferably, when viewed along the sticker conveying direction from upstream to downstream, the external contour of the sticker dispenser is configured with gradually decreasing dimensions.

In some embodiments, the sticker dispenser with sticker roll carrier comprises a photoelectric device disposed adjacent to the output port and configured to acquire output information of the stickers based on photoelectric signals, and a light-shielding portion configured to prevent interference of external light with the photoelectric signals which blocks external light from entering the photoelectric device through the output port.

Preferably, the light-shielding portion is formed at the edge of the output port and extends from the output port toward the photoelectric device.

Preferably, the light-shielding portion is provided with an anti-adhesion portion on its surface opposite to the adhesive side of the sticker, wherein the anti-adhesion portion comprises ribs or protrusions whose tops are formed with cutting edges.

Compared to the prior art, the present disclosure provides a sticker dispenser with a sticker roll carrier, comprising a housing having a first chamber with an opening, a sticker roll carrier assembled within the first chamber and configured to carry sticker rolls, and a cover detachably connected to the housing to enclose the opening of the first chamber, thereby constraining the sticker roll carrier within the first chamber. The sticker rolls are pre-loaded by the manufacturer, enabling direct replacement of the sticker cartridge when depleted, which significantly facilitates the sticker roll replacement operation for users.

BRIEF DESCRIPTION OF THE DRAWINGS

To more clearly illustrate the technical solutions of the embodiments of the present disclosure, the accompanying drawings of the embodiments will be briefly described below, and it will be apparent that the accompanying drawings in the following description relate only to some embodiments of the present disclosure and are not a limitation of the present disclosure.

DETAILED DESCRIPTION

Figure 1:
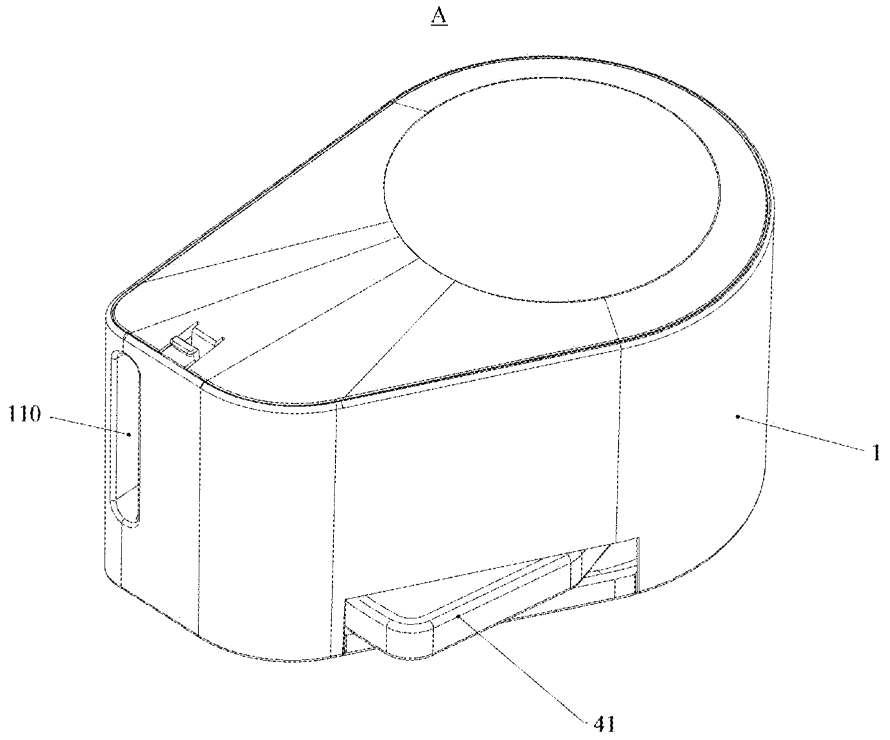
FIG. 1 is a perspective view of a manual sticker dispenser according to an embodiment of the present disclosure.
Figure 2:
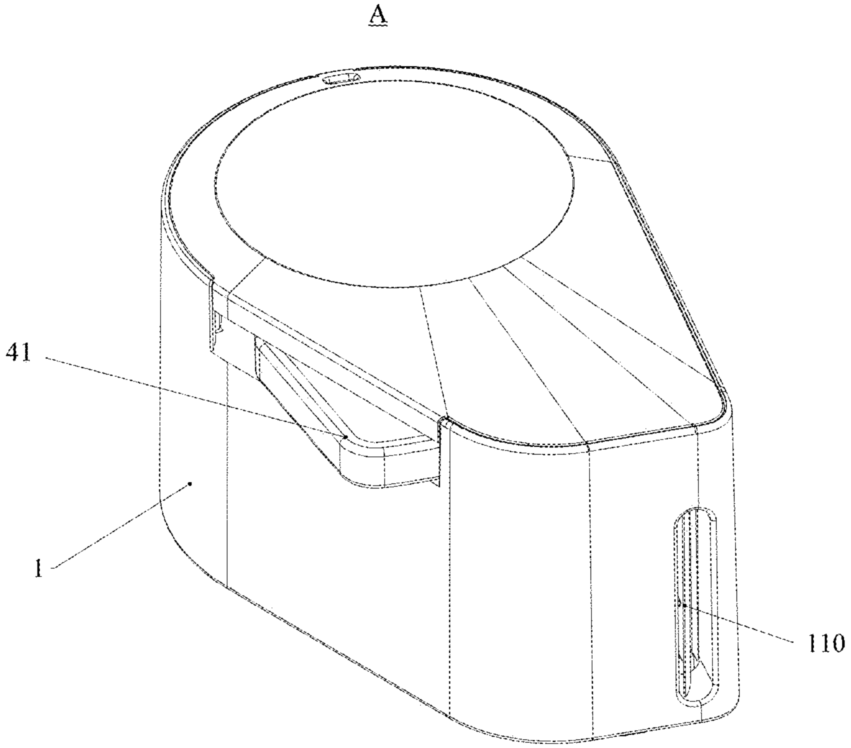
FIG. 2 is a perspective view of a manual sticker dispenser according to the embodiment of the present disclosure at another viewing angle.

To make the purpose, technical solutions, and advantages of the embodiments of the present disclosure clearer, the present disclosure will be described in further detail below in conjunction with the accompanying drawings. The components in the embodiments of the present disclosure generally described and illustrated in the accompanying drawings herein may be arranged and designed in a variety of different configurations. Based on the embodiments in the present disclosure, all other embodiments obtained by those skilled in the art without creative labor are within the scope of the present disclosure.

It should be noted that similar symbols and letters denote similar items in the following accompanying drawings, and therefore, once an item is defined in an accompanying drawing, it is not required to be further defined and explained in subsequent accompanying drawings.

Unless otherwise defined, technical terms or scientific terms used in the present disclosure shall have the ordinary meaning understood by those skilled in the art. The terms "first", "second", etc. used in the specification and in the claims of the present disclosure do not indicate any order, number, or importance, but are only intended to distinguish between different components. Similarly, the terms "a", "one", or "the", etc. do not indicate a limitation of number, but rather the presence of at least one. The terms such as "include" or "contain" mean that the element or object appearing before the "include" or "contain" covers the element or object listed after the "include" or "include", and do not exclude other elements or objects. The terms of "center", "up", "down", "left", "right", "vertical", "horizontal", "inside", "outside", etc. are only intended to indicate a relative positional relationship, and when the absolute position of the described object is changed, the relative positional relationship may also be changed accordingly, which is only for the purpose of facilitating the description of the present disclosure and simplifying the description, and is not intended to indicate or imply that the device or element referred to must have a particular orientation, be constructed and operated in a particular orientation, and therefore cannot be construed as a limitation of the present disclosure.

In the description of the present disclosure, it is to be noted that, unless otherwise expressly provided and limited, the terms "mounted", "connected", and "coupled" are to be understood in a broad sense. For example, it may be a fixed connection, a removable connection, or a connection in one piece; it may be a mechanical connection or an electrical connection; it may be a direct connection or an indirect connection through an intermediate medium; and it may be a connection within the two elements. For those skilled in the art, the specific meaning of the above terms in the present disclosure can be understood in specific cases.

Some embodiments of the present disclosure are described in detail below in conjunction with the accompanying drawings. The features in the following embodiments may be combined with each other without conflict.

Referring to FIGS. 1 to 8, the present disclosure disclosed a manual sticker dispenser A for peeling a sticker on a sticker roll 71. The sticker is peelably affixed to a liner paper 72 and wound into the sticker roll 71. The manual sticker dispenser A is constructed to be capable of peeling the sticker from the liner paper 72 during a sticker conveying process and outputting the sticker from an output port 110.

Figure 3:
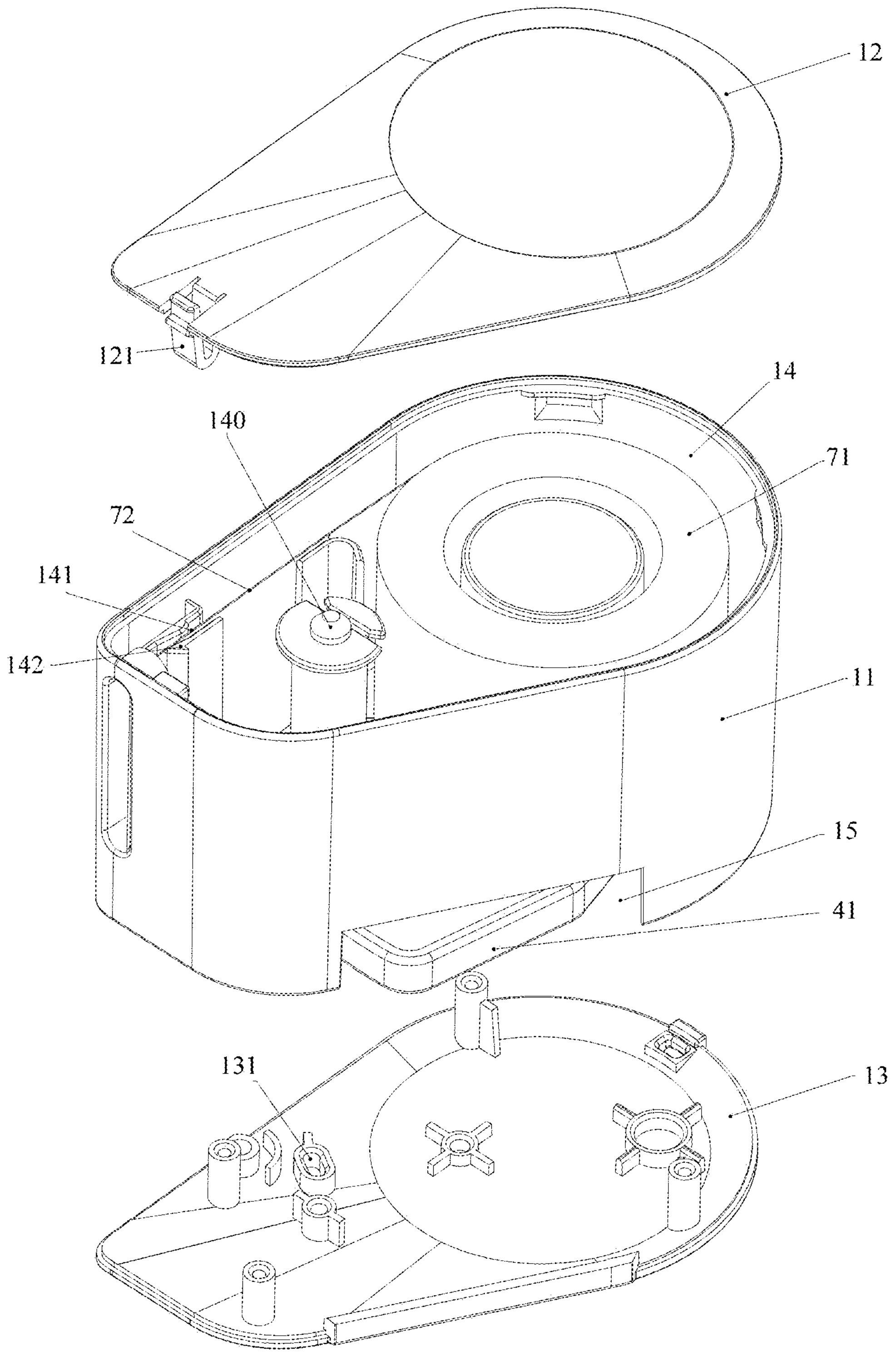
FIG. 3 is a perspective view of a manual sticker dispenser according to the embodiment of the present disclosure.

Referring to FIG. 3, the manual sticker dispenser A includes a housing 1, the housing 1 defining a first chamber 14 for accommodating the sticker roll 71; a conveying path 141 is defined in the first chamber 14, and the housing 1 defines the output port 110 in communication with the first chamber 14. A peeling structure 142 is arranged on the conveying path 141, the peeling structure 142 being disposed at the output port 110. The peeling structure 142 is configured to peel the sticker from the liner paper 72 by conveying the liner paper 72 in a direction different from a travel direction of the sticker. Specifically, the peeling structure 142 includes a turn-peeling portion. The liner paper 72 extends in a relatively flat attitude towards the output port 110 when the liner paper 72 is disposed upstream of the turn-peeling portion, and the liner paper 72 is bent backwards at the turn-peeling portion to travel in a direction different from the travel direction of the sticker, causing the sticker to be peeled off of the liner paper 72. The liner paper 72 after reverse bending at the turn-peeling portion is wound on a winding shaft 140. When the winding shaft 140 is driven to rotate, the winding shaft 140 pulls the liner paper 72 and the sticker affixed to the liner paper 72 to travel on the conveying path 141, and the sticker is peeled off through the peeling structure 142.

Figure 4:
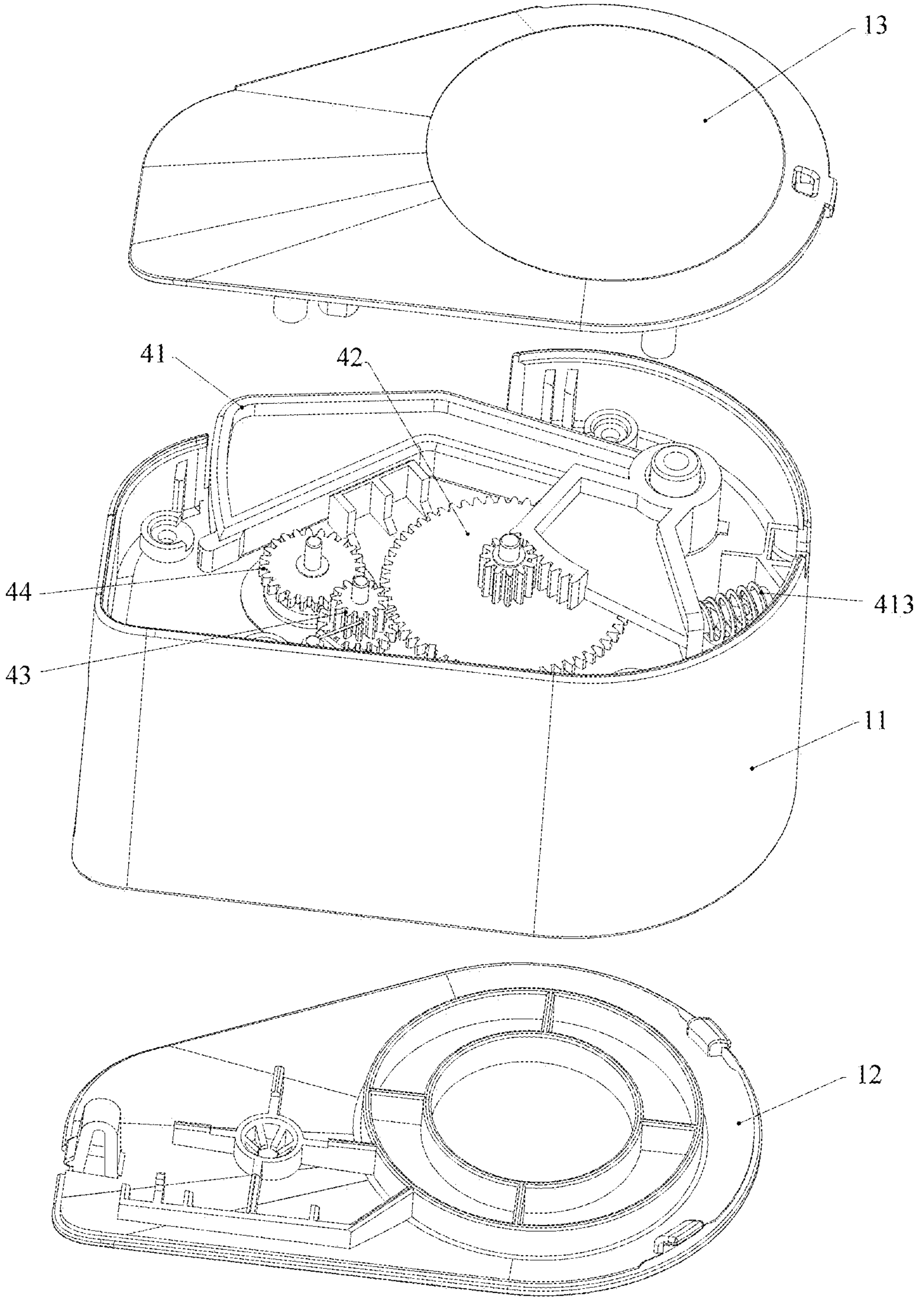
FIG. 4 is a perspective view of a manual sticker dispenser according to the embodiment of the present disclosure at another viewing angle.

Referring to FIGS. 3 and 4, the manual sticker dispenser A includes the winding shaft 140, a transmitting mechanism, and an operating member 41. The operating member 41 is connected to the transmitting mechanism, and the transmitting mechanism is power-transferably connected to the winding shaft 140. The operating member 41 is configured to operatively reciprocate within a set range. Specifically: the operating member 41 is configured to be driven by an operating force to move in a first direction to move from a first position to a second position, as well as to move in a second direction opposite to the first direction to reset from the second position to the first position when the operating force is released. During the movement of the operating member 41 from the first position to the second position, a continuous power transmission chain is formed between the operating member 41, the transmitting mechanism, and the winding shaft 140 to drive the winding shaft 140 in a positive rotation to wind the liner paper 72. During the resetting of the operating member from the second position to the first position, the power transmission chain is disconnected at least in one place between the operating member 41, the transmitting mechanism, and the winding shaft 140, in order to avoid driving the winding shaft 140 in reverse.

Referring to FIGS. 3 and 4, in some embodiments, the housing 1 includes a main body shell 11, an upper cover 12 disposed at a top of the main body shell 11, and a lower cover 13 disposed at a bottom of the main body shell 11. The main body shell 11 includes a bottom wall and a peripheral wall disposed at an edge of the bottom wall, where upper and lower edges of the peripheral wall extend beyond the bottom wall to define a first chamber 14 above the bottom wall for accommodating the sticker roll 71, the winding shaft 140 and to define a second chamber 15 below the bottom wall for arranging the operating member 41 and the transmitting mechanism. An end of the upper cover 12 is arranged with an clastic buckle 121 to detachably connect the upper cover 12 to the main body shell 11 for an easy replacement of the sticker roll 71. The lower cover 13 is fixed to the main body shell 11 by screw locking to prevent the transmitting mechanism arranged in the second chamber 15 from falling out caused by the user easily opening the lower cover 13.

Figure 5:
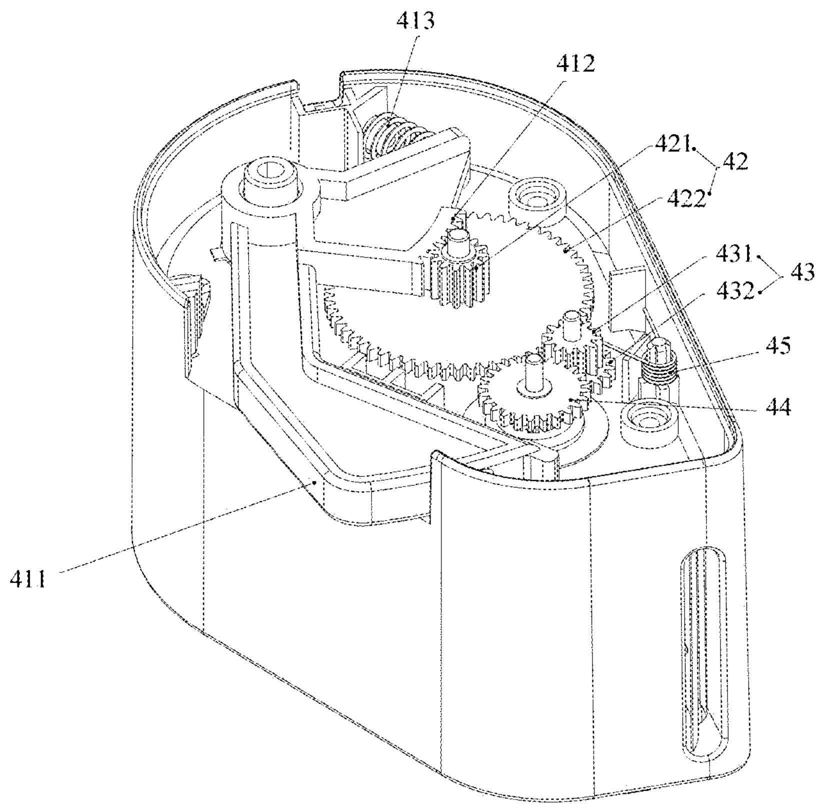
FIG. 5 is a perspective view of a manual sticker dispenser showing an operating member and a transmitting mechanism according to the embodiment of the present disclosure.
Figure 6:
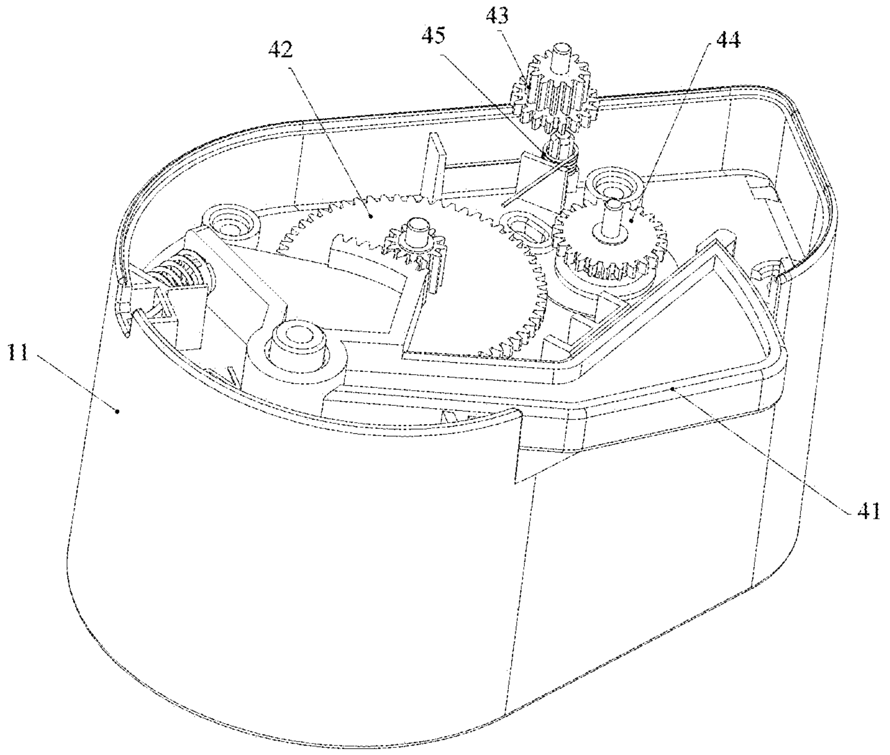
FIG. 6 is a partially view of a manual sticker dispenser showing an operating member and a transmitting mechanism according to the embodiment of the present disclosure from another viewing angle.

Referring to FIGS. 4 to 6, in some embodiments, the operating member 41 is a pressable component, specifically a lever mechanism, configured to pivot around a set axis. The operating member 41 is pivotally connected to the housing 1, which includes a pressing portion 411 and a rack portion 412. The pressing portion 411 is exposed to the housing 1 and can be pressed by the user. The operating member 41 is in the first position before being pressed and is movable to the second position after being pressed. When the pressing portion 411 is pressed, the operating member 41 rotates about its pivot shaft, moving the rack portion 412. The operating member 41 is a one-piece part, e.g. plastic injection molded, and the rack portion 412 has multiple teeth integrally molded for use in conjunction with the transmitting mechanism for transmitting power. In the embodiments, the rack portion 412 is curved and an axis of the curved shape is an axis of the pivot shaft of the operating member 41. The operating member 41 is resiliently pressed against the rack portion 412 by a reset spring 413, and the reset spring 413 provides a resilient force in the opposite direction to that of the pressing force. When the pressing force applied to the pressing portion is withdrawn, the reset spring 413 pushes the operating member 41 to rotate and reset to the first position prior to the application of the pressing force.

Further, the transmitting mechanism is a gear train transmitting mechanism including multiple gears coupled to each other, which is configured to connect the operating member 41 and the winding shaft 140 in a transmission, and to transmit the power output from the operating member 41 to the winding shaft 140 in order to drive the winding shaft 140 to rotate. The transmitting mechanism includes a one-way clutching device, which is configured to be coupled when the operating member 41 is moved in the first direction to implement the power transmission, and to be uncoupled when the operating member 41 is moved in the second direction opposite to the first direction to disconnect the power transmission. In some embodiments, the transmitting mechanism includes a driven gear 44 fixed relative to the winding shaft 140, an actuating gear 42 driven in engagement with the rack portion 412 of the operating member 41, and a movable gear 43 disposed between the driven gear 44 and the actuating gear 42. Specifically, the transmitting mechanism includes the actuating gear 42 located upstream of and remaining coupled to the movable gear 43 in the power transmission direction, and the driven gear 44 located downstream of and detachably coupled to the movable gear 43 in the power transmission direction.

A gear shaft of the actuating gear 42 is non-translatably connected to the housing 1, and the actuating gear 42 is only capable of rotating about the axis of its gear shaft and is not movable in its axial and radial directions. In the embodiments, the actuating gear 42 is a double-layered tower gear having a small-diameter toothed disk 421 and a large-diameter toothed disk 422 that are arranged coaxial, the small-diameter toothed disk 421 of the actuating gear 42 being engaged with the rack portion 412 of the operating member 41, and the large-diameter toothed disk 422 of the actuating gear 42 being engaged with the movable gear 43. In other embodiments, the large-diameter toothed disk 422 may be understood as an actuating gear, and the small-diameter toothed disk 421 as a first gear further included in the transmitting mechanism and coupled to the rack portion 412, the first gear and the actuating gear are coaxially disposed. The diameter D of the actuating gear is greater than double the diameter d of the first gear.

The movable gear 43 is configured to be movable between a coupled position and a detached position. i.e. a gear shaft of the movable gear 43 is translationally connected to the housing 1, while the movable gear 43 is also rotatable about an axis of its gear shaft. An end of the gear shaft of the movable gear 43 is connected to a bottom wall of the main body shell 11 and the other end of the gear shaft of the movable gear 43 is connected to the lower cover 13. Specifically, the bottom wall of the main body shell 11 defines an upper elongate slot (Not shown in the figures) configured for an upper end of the gear shaft of the movable gear 43 to be inserted and slide therein: the lower cover 13 defines a lower elongate slot 131 configured for a lower end of the gear shaft of the movable gear 43 to be inserted and slide therein. The upper elongate slot and the lower elongate slot 131 are opposite each other in the top-bottom direction, forming guide slots for the rotation shaft of the movable gear 43 to be inserted into and to slide within. When the rack portion 412 of the operating member 41 is engaged with the movable gear 43, the movable gear 43 can be pushed to slide along the guiding slot. When the movable gear 43 slides to the coupled position, it can engage with the driven gear 44. When the movable gear 43 slides to the detached position, it can disengage with the driven gear 44.

In some embodiments, the one-way clutching device includes the movable gear 43 and a force-applying member 45. The movable gear 43 is resiliently pushed against by the force-applying member 45, and the force-applying member 45 is configured to apply a resilient force to hold the movable gear 43 in the coupled position. When the operating member 41 moves in the second direction from the second position to the first position, the operating member 41 drives the movable gear 43 to overcome the resilient force and to slip to the detached position. The force-applying member 45 may be a torsion spring or a resilient sheet, with a resilient arm that abuts against the movable gear 43 to exert the resilient force. In the embodiments, the force-applying member 45 is a torsion spring having two resilient arms, one of which abuts against the movable gear 43 and the other abuts against the housing 1. In the embodiments, the spring force of the force-applying member 45 is overcome to separate the movable gear 43 from the driven gear 44. In other embodiments, the force-applying member 45 is configured to apply a resilient force for the movable gear 43 to remain in the detached position, and the operating member 41 drives the movable gear 43 to overcome the resilient force to slide to the coupled position when the operating member 41 moves in the first direction from the first position to the second position: herein when the operating force is released, the movable gear 43 is separated under the action of the spring force of the force-applying member 45. For the above mentioned embodiments, the force-applying member 45 instantly drives the movable gear 43 to the detached position from the driven gear 44 when the external force on the operating member 41 is removed, such that the separation is timelier and the driven gear 44 can be better avoided from being driven to rotate in reverse. Further, there exists a small slip distance for the movable gear 43 to move from the detached position to the coupled position during the movement of the operating member 41 in the first direction, and the driven gear 44 is not driven in the slip distance. i.e. there exists a small empty travel distance of the operating member 41. In some embodiments, the reset spring 413 provides a resilient resetting force greater than the resilient force applied to the movable gear 43 by the force-applying member 45.

In some embodiments, the movable gear 43 is a double-layered tower gear having a small-diameter toothed disk 431 and a large-diameter toothed disk 432 that are arranged coaxial, the small-diameter toothed disk 431 of the movable gear 43 being engaged with the driven gear 44, and the large-diameter toothed disk 432 of the movable gear 43 being engaged with the large-diameter toothed disk 422 of the actuating gear 42. The provision of the actuating gear 42 and movable gear 43 may serve to amplify the fact that the rotation angle of the actuating gear 42 is less than the rotation angle of the driven gear 44 during the movement of the operating member 41 from the first position to the second position.

The driven gear 44 is coaxially and relatively fixedly connected to the winding shaft 140. In the embodiment, the driven gear 44 is connected to the winding shaft 140 by a coupling mechanism. Specifically, a gear shaft of the driven gear 44 is arranged with a polygonal post, and a lower end of the winding shaft 140 is arranged with a polygonal sleeve, the polygonal post being inserted into the polygonal sleeve to realize a relative fixation of the polygonal post and the polygonal sleeve in a rotation direction.

Figure 7:
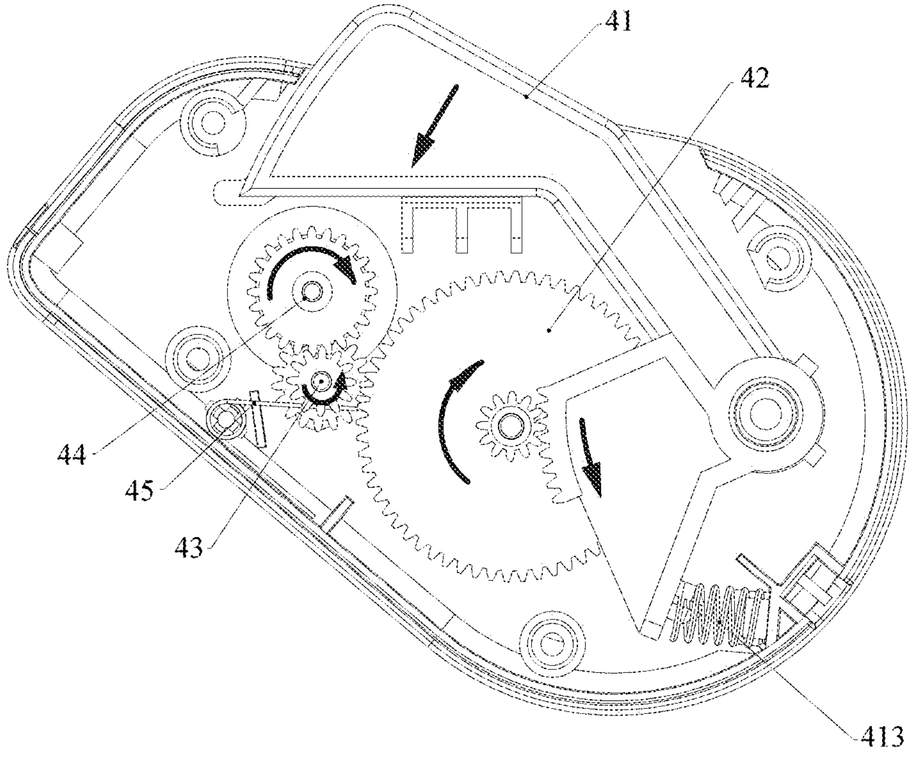
FIG. 7 is a schematic diagram of an action of a transmitting mechanism when an operation member is pressed in a manual sticker dispenser according to the embodiment of the present disclosure from another viewing angle.

Referring to FIG. 7, which is a schematic diagram of an action of the transmitting mechanism during the movement of the operating member 41 in the first direction driven by an operating force. A force is applied to the pressing portion 411 of the operating member 41 as shown by the arrow above thereof, the rack portion 412 of the operating member 41 rotates inwardly as shown by the arrow above thereof, and the actuating gear 42 rotates clockwise as shown by the arrow, in which case the movable gear 43 is pushed to translate in a direction close to the driven gear 44 and engage with the driven gear 44, and the driven gear 44 clockwise rotates as shown by the arrow: driving the winding shaft 140 to rotate in order to pull the liner paper 72 to move, thereby realizing the peeling off of the sticker and the output of the sticker.

Figure 8:
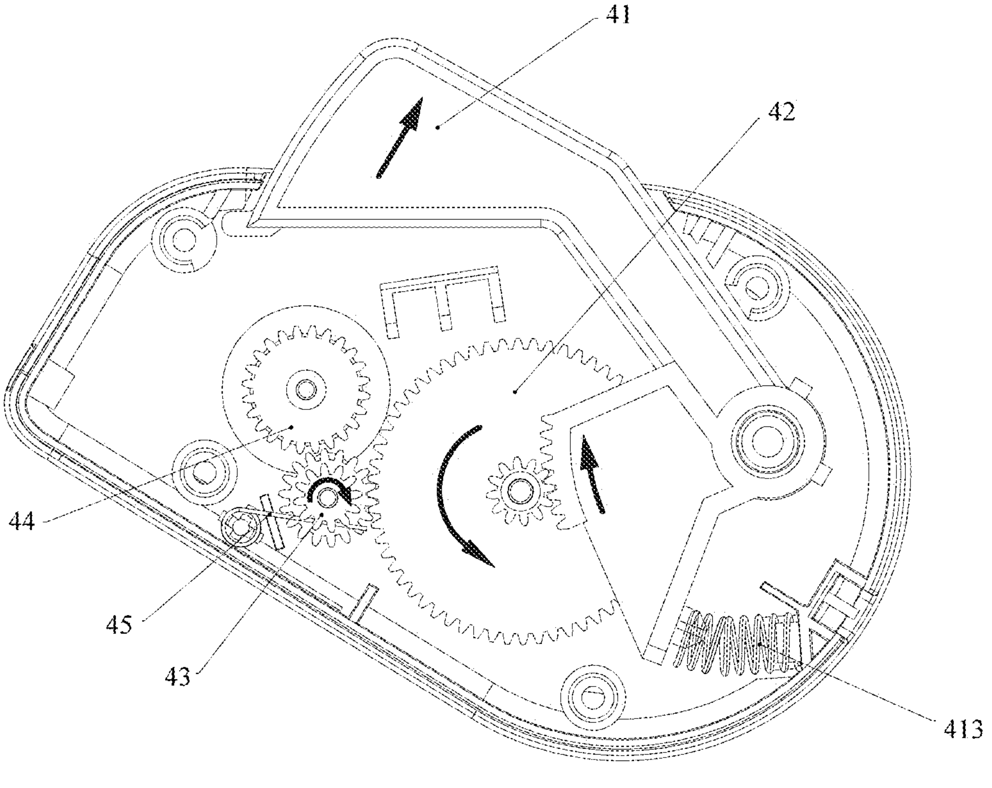
FIG. 8 is a schematic diagram of an action of a transmitting mechanism when an operating member is reset in a manual sticker dispenser according to the embodiment of the present disclosure at another viewing angle.

Referring to FIG. 8, which is a schematic diagram of an action of the transmitting mechanism during a process in which the operating force applied to the operating member 41 is released and the operating member 41 is driven by the reset spring 413 to move in the second direction to reset to the first position. A force is applied to the rack portion 412 of the operating member 41 as shown by the arrow above thereof, the pressing portion of the operating member 41 moves outward as shown by the arrow above thereof, and the actuating gear 42 rotates counterclockwise as shown by the arrow, in which case the movable gear 43 is pushed to translate in a direction away from the driven gear 44 and disengage with the driven gear 44, and the rotation of the movable gear 43 driven by the actuating gear 42 is unable to be transmitted to the driven gear 44, i.e., the driven gear 44 does not rotate counterclockwise, and the winding shaft 140 does not move, thereby avoiding that the wound liner paper is loosened and the sticker cannot be output when the operating member is pressed next time, caused by the winding shaft 140 rotating counterclockwise in the course of resetting the operating member 41.

It should be noted that the present embodiment is illustrated with the movable gear 43 and the driven gear 44 is able to be disengaged as an example, and it can be understood that in other embodiments, it is sufficient to arrange such that a disengagement is feasible at any position in the transmission chain between the operating member 41 and the winding shaft 140. It should also be noted that, in the present embodiment, the switching between engagement and disengagement is achieved by translation of the movable gear 43, which in other embodiments can be achieved by means of a ratchet structure. For example, in some embodiments, the one-way clutching device is a one-way bearing, i.e. an overrunning clutch, which is coupled to a transmitting gear within the transmitting mechanism. The one-way bearing is free to rotate in one direction independently of the winding shaft 140. While in the other direction opposite, the one-way bearing is locked to the winding shaft 140 and both rotate in synchronization.

As can be seen from the above preferred embodiments, the present disclosure provides a manual sticker dispenser A including a winding shaft 140, a transmitting mechanism, and an operating member 41. The operating member 41 is configured to be driven by an operating force to move in a first direction, and is configured to move in a second direction opposite to the first direction when the operating force is released. During a movement of the operating member 41, a continuous power transmission chain is formed between the operating member 41, the transmitting mechanism, and the winding shaft 140, to drive the winding shaft 140 to rotate and wind the liner paper. During a movement of the operating member 41 in the second direction, the one-way clutching device disconnects the power transmission, which avoids driving the winding shaft 140 in reverse. Therefore, the output of stickers may be realized by manually applying force on the operating member 41, without using electrical components, thereby reducing costs and enhancing operability and entertainment.

Referring to FIGS. 9 to 15, an electric sticker dispenser B according to another embodiment of the present disclosure is used for peeling stickers 811 from a sticker roll 81. The stickers 811 are peelably affixed to liner paper 812 and wound into the sticker roll 81. The electric sticker dispenser B is configured to separate the stickers 811 from the liner paper 812 during a sticker conveying process and output the stickers through a sticker output port 210.

The electric sticker dispenser B comprises a housing 2, an electric motor 5, a winding shaft 240, a transmitting mechanism 53, a power switch 51, and an activation assembly 52. A turn-peeling portion 243, a sticker guide portion 242, and a liner paper guide portion 244 are all disposed on the housing 2. The following describes each component of the electric sticker dispenser B in detail.

Figure 9:
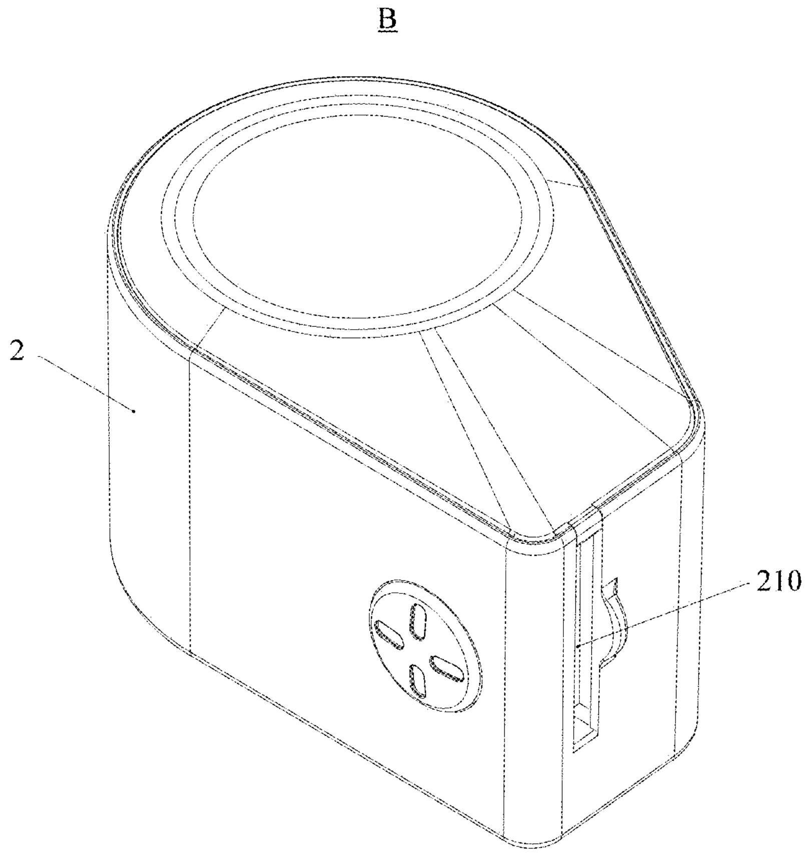
FIG. 9 is a perspective view of an electric sticker dispenser according to the present disclosure.
Figure 10:
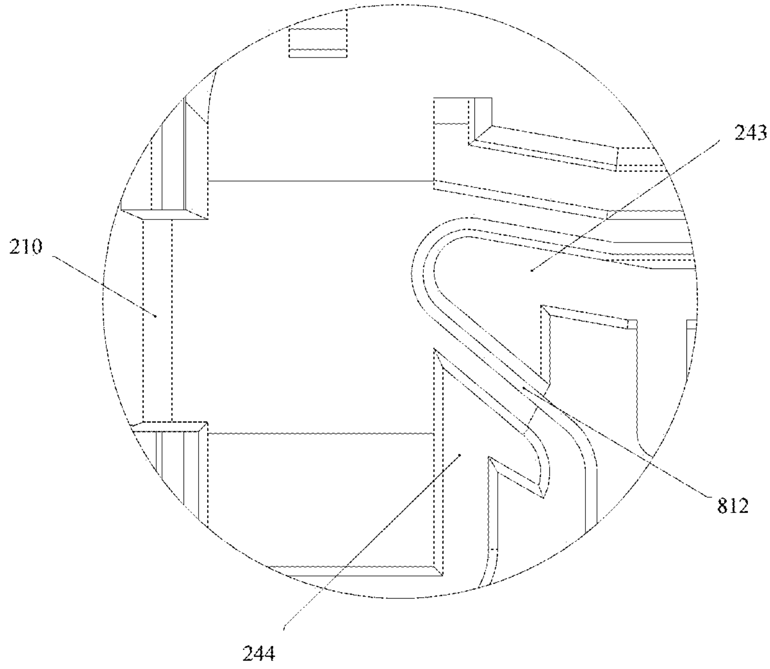
FIG. 10 is a partial enlarged view of the output port of the electric sticker dispenser according to the present disclosure.
Figure 11:
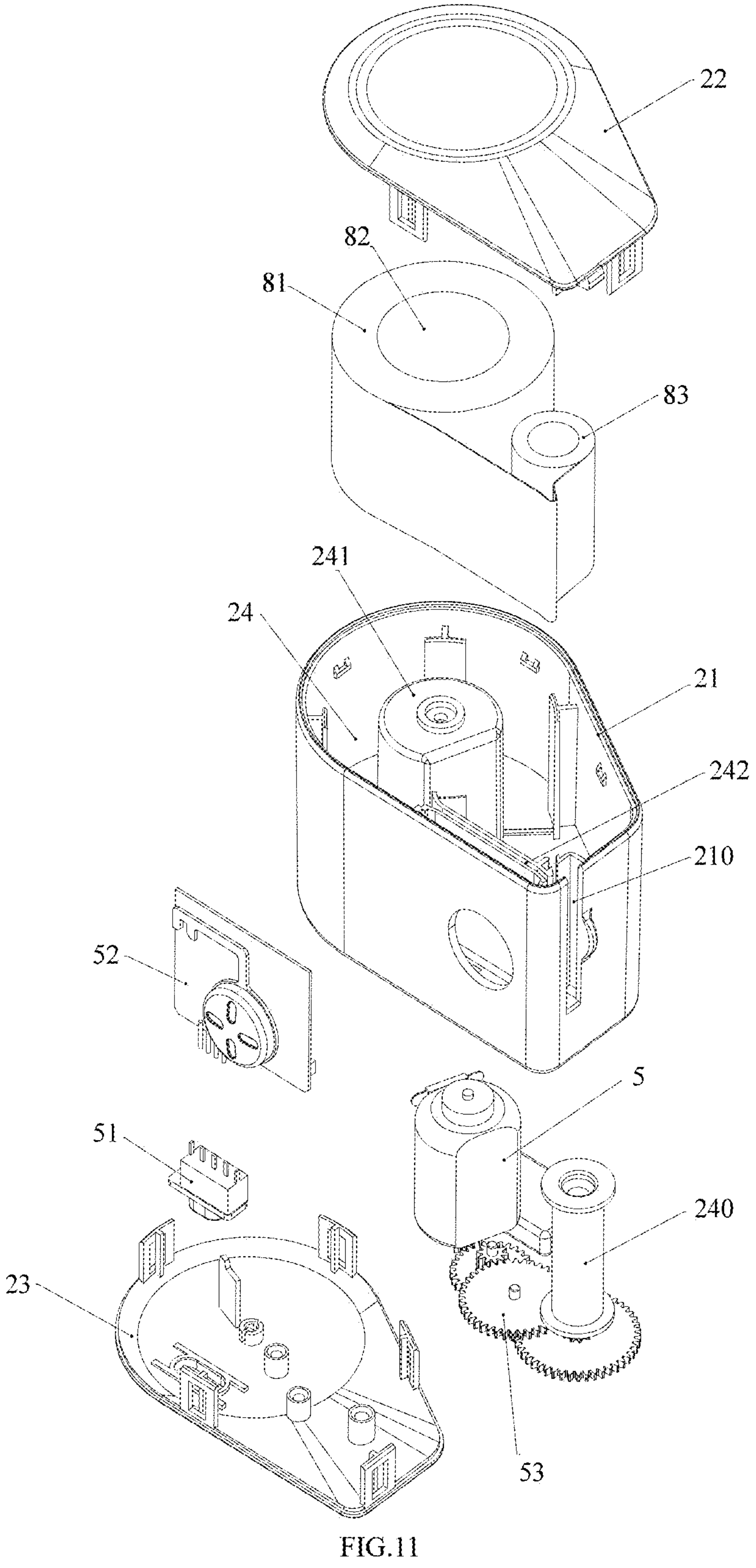
FIG. 11 is an exploded perspective view of the electric sticker dispenser shown in FIG. 9.
Figure 12:
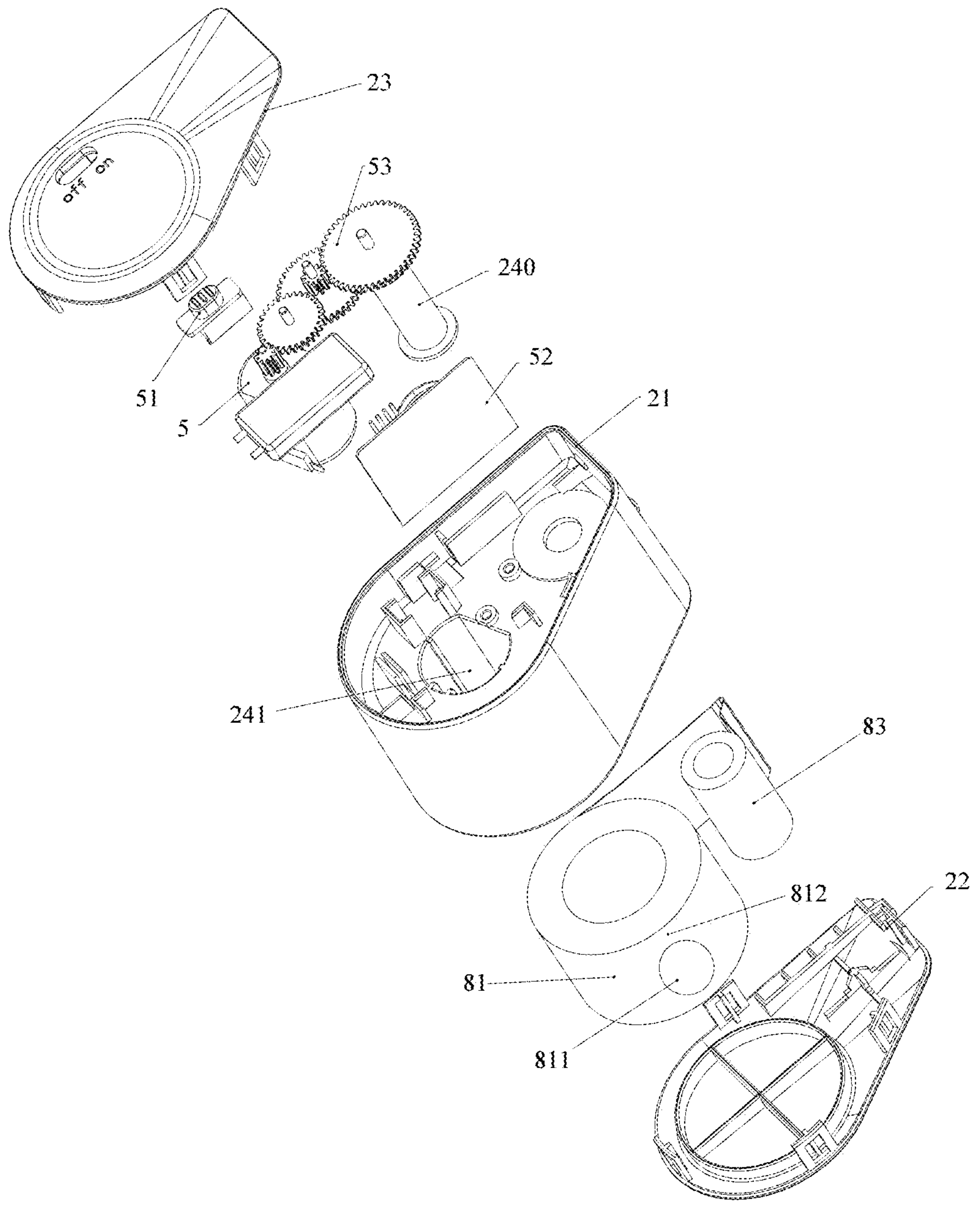
FIG. 12 is an exploded perspective view of the electric sticker dispenser shown in FIG. 9 at another viewing angle.
Figure 13:
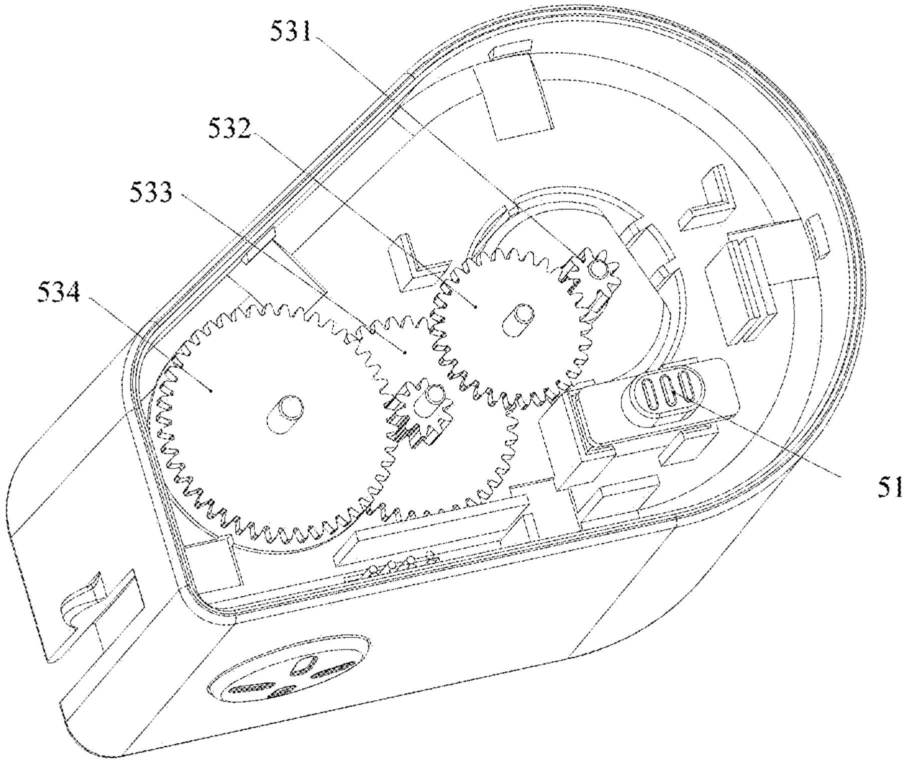
FIG. 13 is a perspective view of the electric sticker dispenser shown in FIG. 9 with the lower plate removed.
Figure 14:
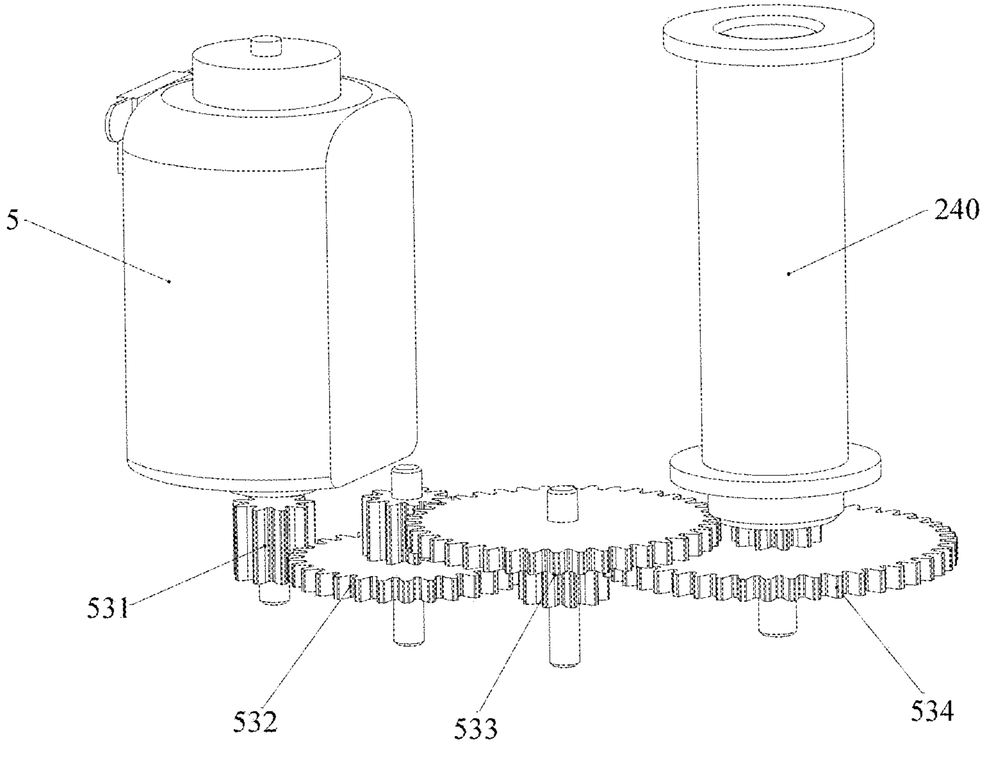
FIG. 14 is a perspective view showing the electric motor, transmitting mechanism and winding shaft of the electric sticker dispenser shown in FIG. 9.
Figure 15:
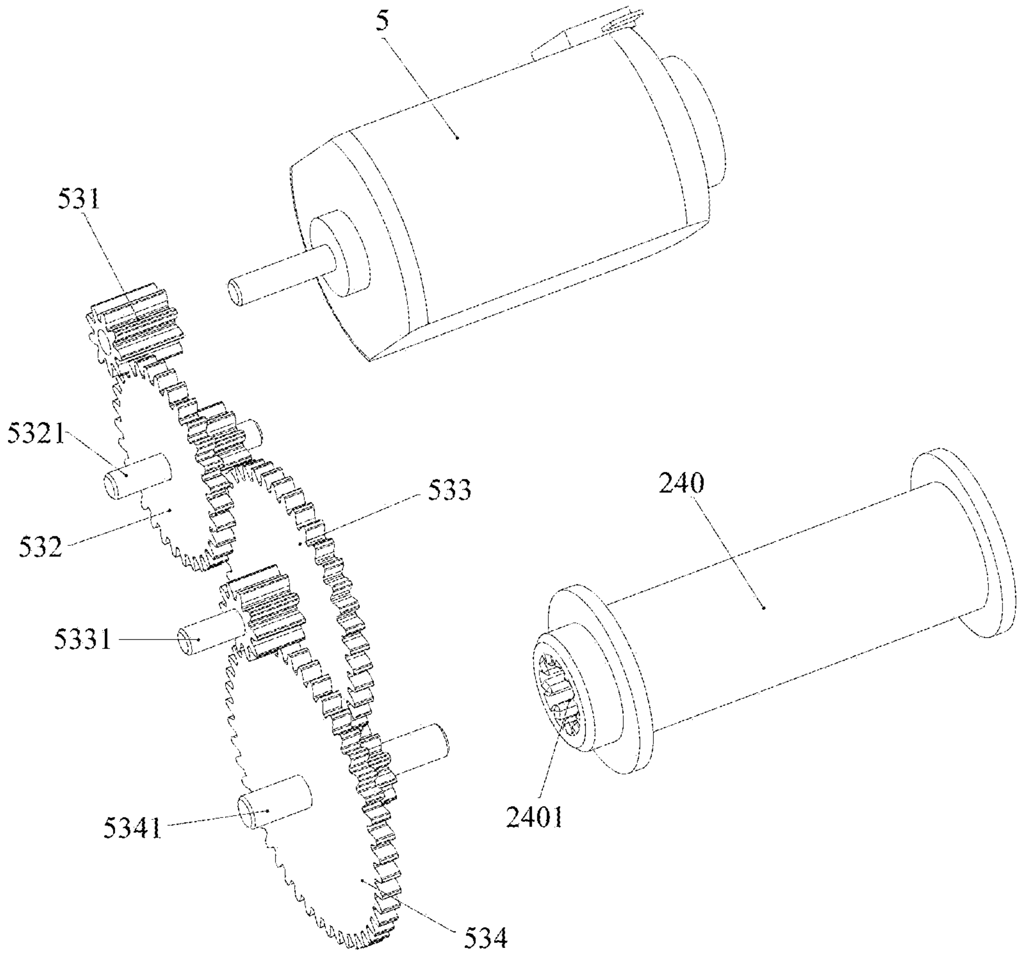
FIG. 15 is an exploded perspective view showing the electric motor, transmitting mechanism and winding shaft of the electric sticker dispenser shown in FIG. 9.

Referring to FIGS. 9 to 11, the housing 2 is a plastic component, with the turn-peeling portion 243, sticker guide portion 242, and liner paper guide portion 244 integrally injection-molded on the housing 2. The housing 2 defines a first chamber 24 accommodating the liner paper 812 with adhered stickers 811 wound in a roll or folded in layers. The output port 210 communicates between the first chamber 24 and the exterior of the housing 2, enabling the stickers 811 to be conveyed from the first chamber 24 to the output port 210 and partially exposed outside the housing 2 for user removal. In some embodiments, the housing 2 comprises an upper cover 22, a main body shell 21, and a lower cover 23, where both the upper cover 22 and lower cover 23 are plate-shaped, and the main body shell 21 is box-shaped with a compartment. The housing 2 includes at least one peripheral wall that defines the first chamber 24 internally. In some embodiments, the main body shell 21 includes a peripheral wall forming the circumferential enclosure and a base wall connected to the lower end of the peripheral wall, with an open upper portion of the main body shell 21. The peripheral wall and base wall collectively define the first chamber 24, while the upper cover 22 is mounted over the open upper portion of the main body shell 21 to cover the first chamber 24. The lower cover 23 is installed beneath the base wall of the main body shell 21, forming an installation space for the transmitting mechanism 53 between the lower cover 23 and the base wall.

The housing 2 has an extension shell 241 protruding into the first chamber 24. The extension shell 241 is configured as a downward-opening cylindrical structure. Specifically, the extension shell 241 extends upward from the base wall of the main body shell 21, forming an opening at its connection with the base wall to allow at least a portion of the electric motor 5 to be inserted through the opening into the extension shell 241, thereby extending into the first chamber 24. The shape and dimensions of the extension shell 241 are configured to accommodate the sticker roll 81 being sleeved over it while allowing rotational movement around the extension shell 241. Specifically, the sticker roll 81 is provided with a central positioning hole 82, and the extension shell 241 is configured to extend through the central positioning hole 82 for positioning the sticker roll 81. The radial dimension of the extension shell 241 is smaller than that of the central positioning hole 82 to ensure the sticker roll 81 can be properly sleeved over the central positioning hole 82. In some embodiments, the radial dimension of the central positioning hole 82 is configured to be significantly larger than that of the extension shell 241, enabling the sticker roll 81 to become eccentrically offset relative to the extension shell 241 when the wound liner paper 812 and stickers 811 are reduced, thereby facilitating sticker 811 conveyance. The extension shell 241 is formed as a substantially cylindrical sleeve to allow rotational movement of the sticker roll 81 about the extension shell 241, an accommodation is provided on the extension shell 241, configured to form a pickup space (not shown in the figures) between itself and the wall surface of the central positioning hole 82, allowing the sticker roll 81 to be grasped and removed from the pickup space. In some embodiments, at least a portion of the electric motor 5 is disposed within the extension shell 241, which is configured as a cylindrical sleeve with a vertical planar surface on its peripheral wall to facilitate alignment and installation with the electric motor 5. The vertical planar surface forms the accommodation. The electric motor 5 is provided with a positioning portion (e.g., a planar surface on the motor's peripheral wall) corresponding to the accommodation, wherein the positioning portion engages with the accommodation to circumferentially fix the electric motor 5 relative to the extension shell, thereby securing the electric motor 5 in position within the extension shell 241. In some embodiments, the electric sticker dispenser B adopts a whistle-like configuration. When viewed along the sticker conveying direction from upstream to downstream, the external contour of electric sticker dispenser B is configured with gradually decreasing dimensions.

Referring to FIGS. 12 to 15, the winding shaft 240 is capable of winding the liner paper 812 to convey the stickers 811 to the output port 210. The electric motor 5 outputs rotational power and is transmission-connected to the winding shaft 240 through the transmitting mechanism 53, thereby driving the winding shaft 240 to rotate and pull the liner paper 812 for conveying and peeling the stickers 811. The liner paper 812 after sticker peeling is wound on the winding shaft 240 to form a liner paper roll 83. The main body of the electric motor 5 is positioned within the extension shell 241 located in the first chamber 24, with its output shaft oriented downward and situated between the lower cover 23 and the base wall of the main body shell 21 of the housing 2. Similarly, the lower end of the winding shaft 240 is positioned between the lower cover 23 and the base wall of the main body shell 21, while the transmitting mechanism 53, located in the same space, is transmission-connected between the output shaft of the electric motor 5 and the winding shaft 240. The transmitting mechanism 53 includes a gear train coupled between the electric motor 5 and the winding shaft 240, comprising a driven gear coupled to the winding shaft 240, where the lower end of the winding shaft 240 is provided with a sleeve portion 2401 that meshes with and connects to the driven gear. Specifically, in some embodiments, the gear train comprises a first gear 531, a second gear 532, a third gear 533, and a fourth gear 534, wherein the second gear 532 to the fourth gear 534 are all dual-layer gears. The first gear 531 is sleeved on the output shaft of the electric motor 5, the second gear 532 meshes with and is transmission-connected to the first gear 531, the third gear 533 meshes with and is transmission-connected to the second gear 532, and the fourth gear 534 meshes with and is transmission-connected to the third gear 533. The fourth gear 534 serves as the aforementioned driven gear, and the inner wall surface of the sleeve portion 2401 of the winding shaft 240 is provided with teeth structures to mesh with and connect to the fourth gear 534. The second gear 532 is fixedly provided with a second gear shaft 5321, the third gear 533 is fixedly provided with a third gear shaft 5331, and the fourth gear 534 is fixedly provided with a fourth gear shaft 5341. These gear shafts are configured to support and mount their respective gears between the lower cover 23 and the base wall of the main body shell 21, wherein the end of the fourth gear shaft 5341 facing the winding shaft 240 is tightly pressed into the winding shaft 240 via interference fit to ensure reliable connection between the fourth gear 534 and the winding shaft 240.

Figure 16:
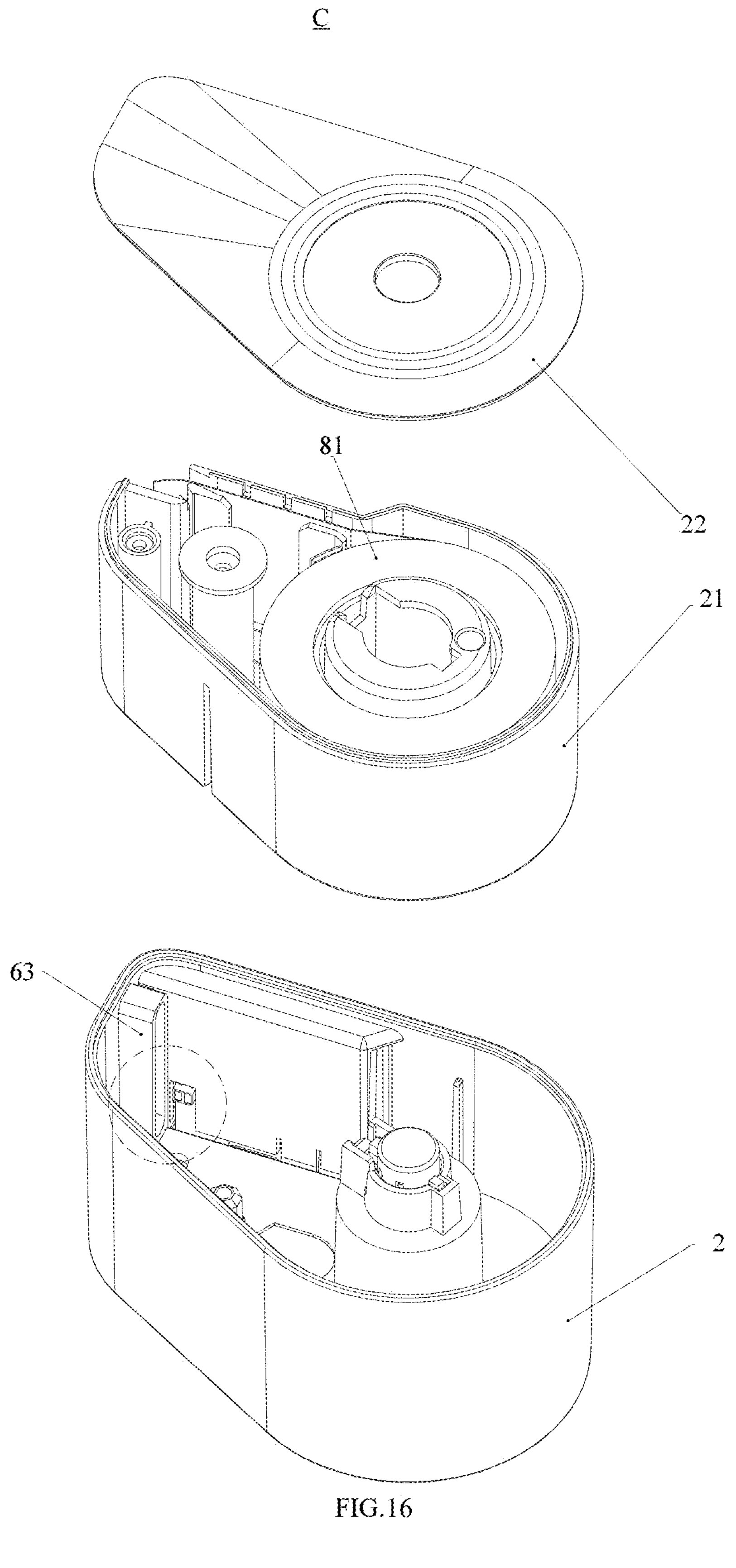
FIG. 16 is an exploded perspective view of another embodiment of the electric sticker dispenser according to the present disclosure.
Figure 17:
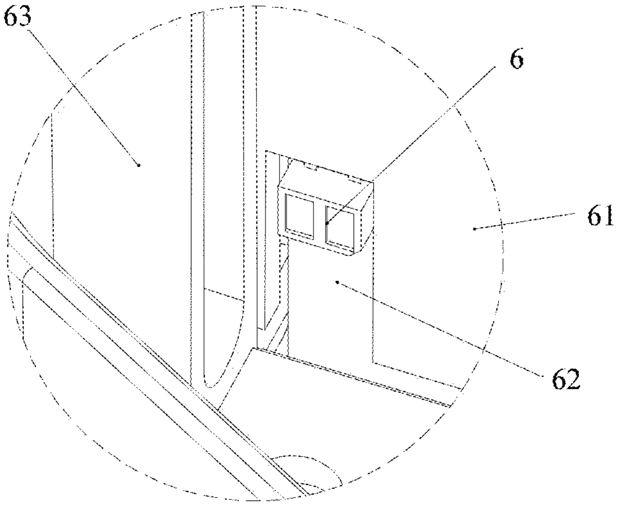
FIG. 17 is a partial enlarged view of the output port of the electric sticker dispenser shown in FIG. 12.
Figure 18:
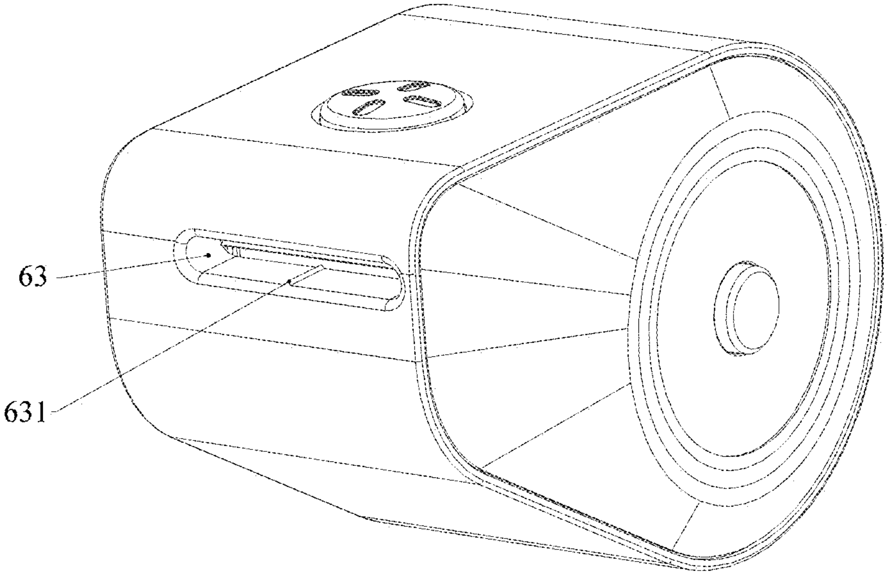
FIG. 18 is a perspective view of the electric sticker dispenser shown in FIG. 12.

Referring to FIGS. 16 to 18, the present disclosure is an electric sticker dispenser C of another embodiment. Components identical to those in the aforementioned embodiments will not be redundantly described. In some embodiments, the electric sticker dispenser C may further include a photoelectric device 6 and a light-shielding portion 63. The photoelectric device 6 acquires output information of the stickers based on photoelectric signals and is disposed adjacent to the output port 210. The light-shielding portion 63 configured to prevent interference of external light with the photoelectric signals serves to block external light from entering the photoelectric device 6 through the output port 210.

Furthermore, the light-shielding portion 63 is formed at the edge of the output port 210 and extends from the output port 210 toward the photoelectric device 6. The surface of the light-shielding portion 63 opposite to the adhesive side of the stickers 811 is provided with an anti-adhesion portion 631, which consists of ribs or protrusions whose tops are formed with cutting edges.

The main body shell 21 houses an operation circuit board internally, with the photoelectric device 6 mounted on the operation circuit board. A cover plate 61 is installed on the main body shell 21 to shield the operation circuit board, featuring an avoidance hole 62 that exposes the photoelectric device 6 by providing accommodation. The avoidance hole 62 prevents the photoelectric device 6 from being obstructed by the cover plate 61. The cover plate 61 covers most areas of the operation circuit board, thereby providing protective functionality for the circuit board.

The electric sticker dispenser C provided in this embodiment incorporates a photoelectric device 6 positioned adjacent to the output port 210 for detecting sticker output information, thereby enhancing intelligent control and notification capabilities of the electric sticker dispenser B. The electric sticker dispenser C includes a light-shielding portion 63 configured to block external light from entering the photoelectric device 6 through the output port 210, preventing interference with detection accuracy. This configuration ensures more precise detection, avoids erroneous judgments, and improves the accuracy of intelligent control and notifications in the electric sticker dispenser B.

Figure 30:
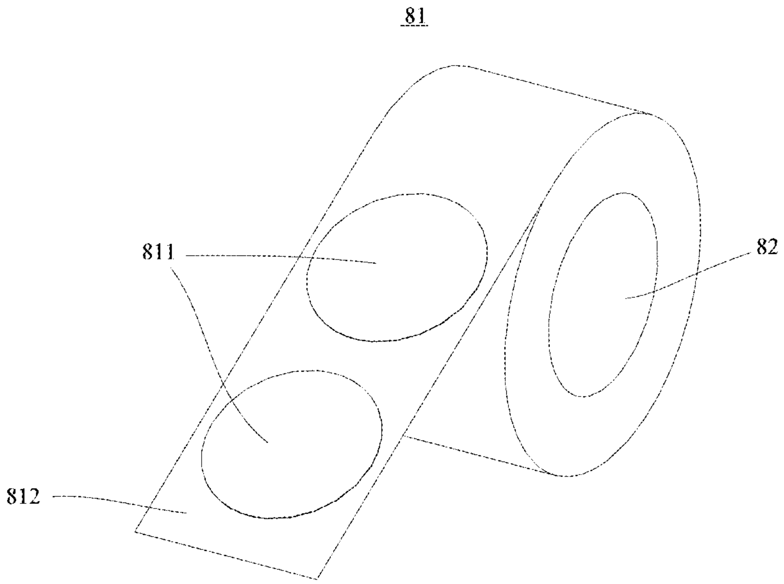
FIG. 30 is a schematic view showing the usage deployment of the sticker roll according to the present disclosure.
Figure 31:
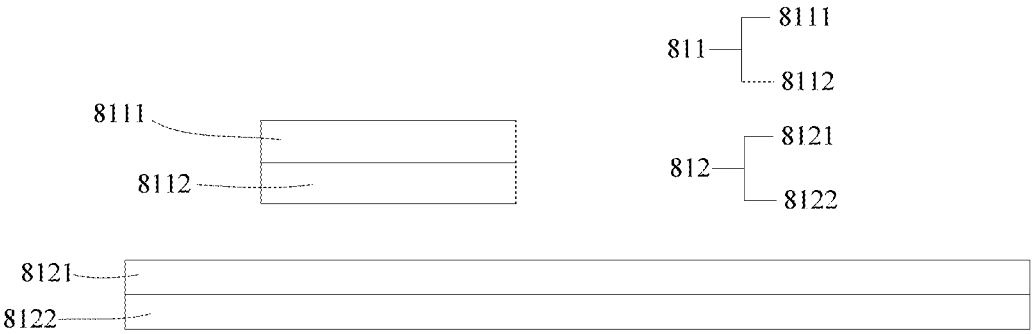
FIG. 31 is a sectional view of the sticker and liner paper in the sticker roll according to the present disclosure.
Figure 32:
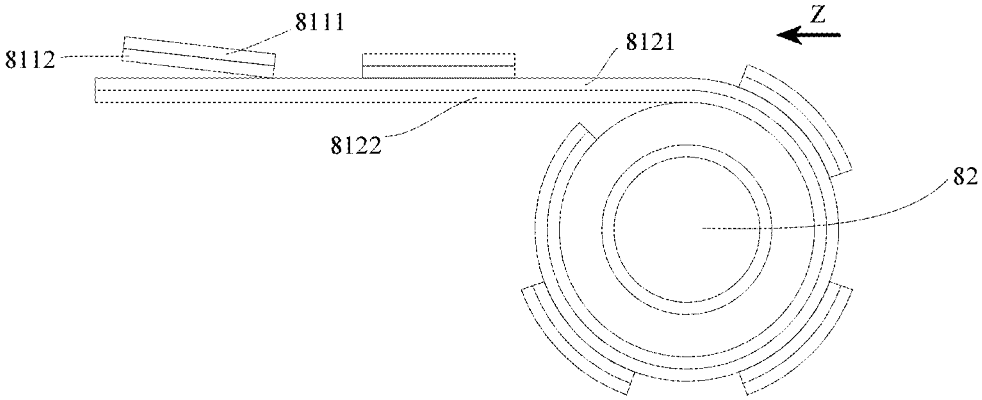
FIG. 32 is a schematic view showing the operational state of the sticker roll embodiment illustrated in FIG. 30.

Referring to FIGS. 30 to 32, in some embodiments, the sticker roll 81 comprises windable liner paper 812 and stickers 811 peelably adhered to the liner paper 812. The sticker roll 81 conveys the stickers along a conveyance path direction z to an output port. Each sticker 811 includes a face stock layer 8111 and an adhesive layer 8112, with the back side of the face stock layer 8111 bonded to one side of the adhesive layer 8112 with a first adhesive force therebetween. The liner paper 812 comprises a base material 8122 and a release layer 8121 thereon, the release layer 8121 having a smooth surface treated with release properties, wherein the other side of the adhesive layer 8112 is bonded to the surface of the release layer 8121 with a second adhesive force therebetween, and wherein the first adhesive force is greater than the second adhesive force. It should be understood that the stickers 811 are temporarily adhered to the liner paper 812 via the adhesive layer 8112, such that during peeling, the face stock layer 8111 remains bonded to the adhesive layer 8112 while the adhesive layer 8112 separates from the release layer 8121, thereby preventing damage to cither the stickers 811 or the liner paper 812. Both the first and second adhesive forces refer to the bonding force per unit area perpendicular to the adhesive layer 8112.

The liner paper 812 comprises a base material 8122 and a release layer 8121 thereon. The base material 8122 may include, but is not limited to, conventional kraft paper, offset paper, glassine paper, translucent or transparent paper, fabric, or plastic film. The release layer 8121 may include, but is not limited to, various organic or inorganic release treatment agents with release properties such as silicone resins or non-silicone compounds, applied as single-sided or double-sided coatings. The liner paper 812 is integrally formed as an elongated strip without tear lines or perforations, and can be wound from one end along the longitudinal axis of the strip to form the sticker roll 81 with a central positioning hole 82. A plurality of stickers 811 are peelably adhered to the liner paper 812, spaced apart along the winding direction, wherein the winding direction refers to outward winding forming the sticker roll 81 with the stickers 811 positioned on the outer side of the roll, such that the outermost layer of the sticker roll 81 exposes the face stock layer 8111.

Referring to FIGS. 23 to 24 and 30 to 34, in some embodiments, a sticker dispenser further includes a sticker roll carrier 9. The sticker roll carrier 9 comprises an upper plate 91 and a lower plate 92 arranged opposite to each other, with a sleeve column 93 and a winding shaft 94 disposed between the upper and lower plates. The sleeve column 93 is configured for mounting the sticker roll 81 through its central positioning hole 82, while the winding shaft 94 is detachably arranged between the upper and lower plates and can be fixed to the other end of the liner paper 812 for winding the liner paper 812 after sticker 811 separation to form a liner paper roll 83. The sticker roll carrier 9 additionally includes a sticker conveying section 95 and a turn-peeling portion 96 positioned between the upper and lower plates. Along the conveying path formed from the sleeve column 93 to the winding shaft 94 for the liner paper 812, the sticker conveying section 95 is located between the sleeve column 93 and the turn-peeling portion 96 to transport stickers toward the turn-peeling portion 96, whereas the turn-peeling portion 96 is positioned between the sticker conveying section 95 and the winding shaft 94 to divert the liner paper 812 in a direction different from the travel path of the stickers 811, thereby effecting separation of the stickers 811 from the liner paper 812.

Furthermore, the upper plate 91 and lower plate 92 may be discrete components, with the sleeve column 93, sticker conveying section 95, and turn-peeling portion 96 arranged therebetween. At least one of the sleeve column 93, sticker conveying section 95, or turn-peeling portion 96 is provided with snap hooks, snap grooves 930, positioning protrusions, or positioning recesses 9501, while the upper plate 91 or lower plate 92 is provided with mating parts configured to engage or interlock with said snap hooks, snap grooves 930, positioning protrusions, or positioning recesses 9501.

In some embodiments, taking as an example the configuration where the sleeve column 93, sticker conveying section 95, and turn-peeling portion 96 are all integrally formed with the lower plate 92, the lower plate 92 is implemented as a horizontally extended thin plate with the sleeve column 93, sticker conveying section 95, and turn-peeling portion 96 all vertically extending upward from the thin plate. The lower plate 92 along with the sleeve column 93, sticker conveying section 95, and turn-peeling portion 96 are all plastic components that can be manufactured through integrated injection molding.

In some embodiments, the sleeve column 93 is configured as a hollow cylinder with snap grooves 930 provided on its peripheral wall. The sticker roll carrier 9 further includes an inner limiting portion 950 positioned between the upper plate 91 and lower plate 92 on the inner side of the sticker output path. The inner limiting portion 950 is formed as a hollow triangular prism vertically extending upward from the lower plate 92, with its upper triangular opening constituting the positioning recess 9501. The hollow triangular prism configuration is merely exemplary, where both the base edge of the triangular prism and the sticker conveying section 95 are disposed on opposite sides of the conveying path, forming an upstream limiting structure for the liner paper 812 and sticker 811 conveyance path between the sticker conveying section 95 and the prism's base edge.

In some embodiments, the turn-peeling portion 96 comprises an outer limiting portion 960 and a guide structure 961, both formed as plate-like structures vertically extending upward from the lower plate 92. A peeling point is created at the junction between the outer limiting portion 960 and the guide structure 961, where the conveying direction of both the sticker 811 and liner paper 812 changes to establish a structure enabling their separation. Specifically, after the winding shaft 94 is fixed to the other end of the liner paper 812, it provides tension to advance the liner paper 812 along the conveying path. Under this tension, the liner paper 812 first travels from the inner limiting portion 950 toward the sticker conveying section 95, proceeds past the sticker conveying section 95 to reach the junction point, where its direction changes toward the winding shaft 94, ultimately being wound onto the winding shaft 94 to form the liner paper roll 83. The tension provides a peeling force at the peeling point, where this peeling force exceeds the second adhesive strength. Since the remaining portion of the sticker 811 has not yet reached the peeling point, it continues to receive tension from the liner paper 812 along the conveying path, maintaining the sticker's forward movement through either pulling or pushing forces. At the peeling point, the liner paper 812 and sticker 811 begin separating due to their divergent travel directions. The peeling force refers specifically to the force perpendicular to the adhesive layer 8112.

Figure 35:
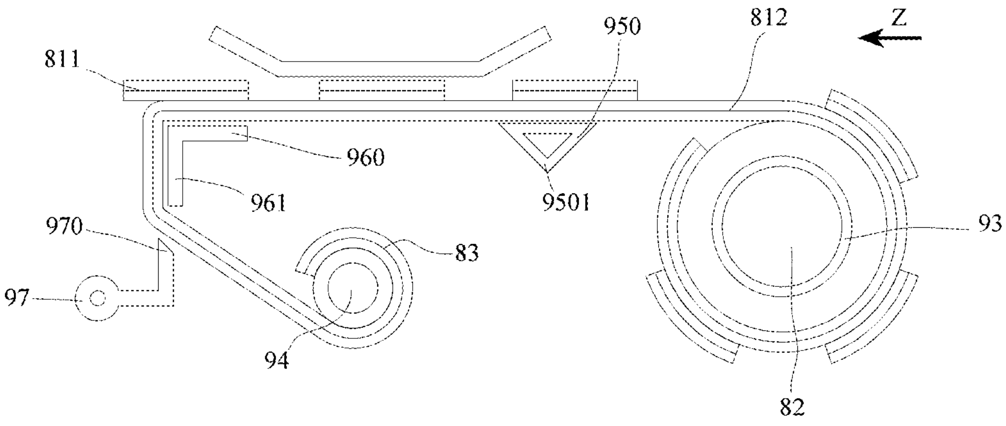
FIG. 35 is a schematic view of another embodiment of the turn-peeling portion of the sticker roll carrier according to the present disclosure.
Figure 36:
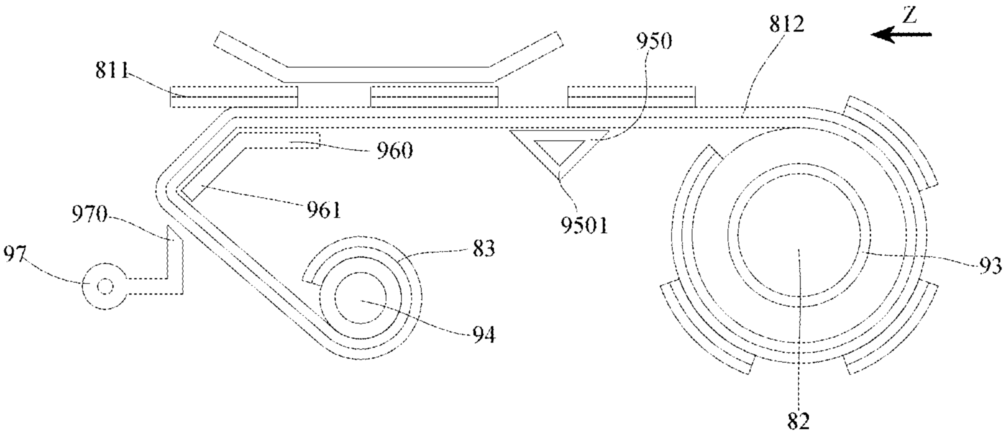
FIG. 36 is a schematic view of another embodiment of the turn-peeling portion of the sticker roll carrier according to the present disclosure.
Figure 37:
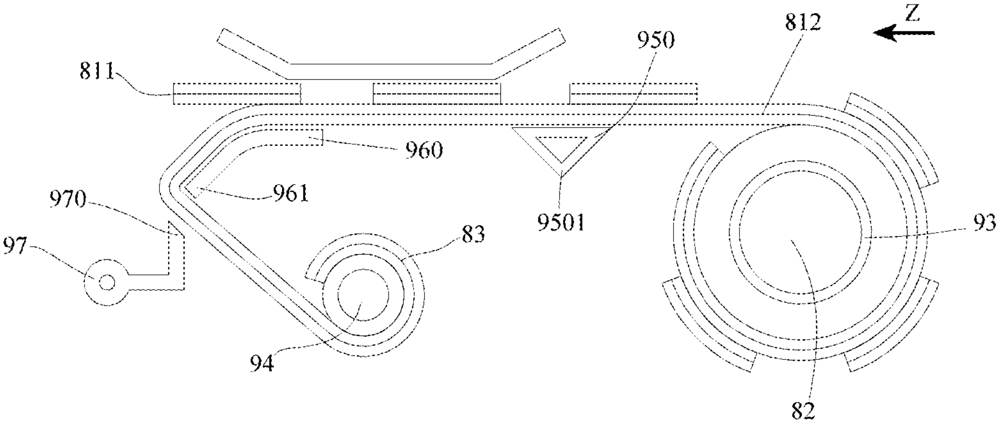
FIG. 37 is a schematic view of another embodiment of the turn-peeling portion of the sticker roll carrier according to the present disclosure.

In some embodiments, the outer limiting portion 960 and the guide structure 961 form an acute-angle configuration designed to generate effective peeling force. It should be understood that the vertically extending plate-like structures are merely exemplary, as any configuration of the outer limiting portion 960 and guide structure 961 that alters the travel direction of the liner paper 812 to create a peeling point at their junction, thereby producing peeling force to initiate separation between the liner paper 812 and sticker 811 at this point, falls within the scope of the present disclosure. As illustrated in FIGS. 35 to 37, the configuration between the outer limiting portion 960 and guide structure 961 is not limited to forming an acute angle, provided that their arrangement can redirect the liner paper 812 to establish the peeling point with sufficient peeling force for separation initiation, all such implementations are protected under the turn-peeling portion 96 of the present disclosure.

Figure 33:
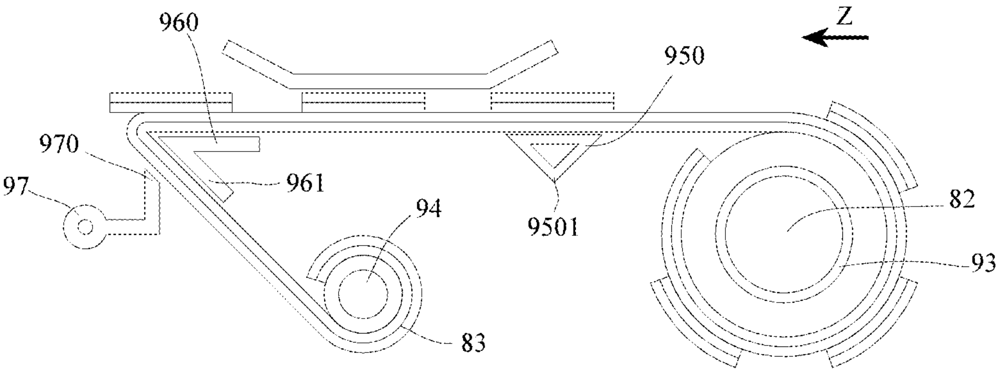
FIG. 33 is a schematic view of another embodiment of the sticker roll carrier according to the present disclosure.
Figure 34:
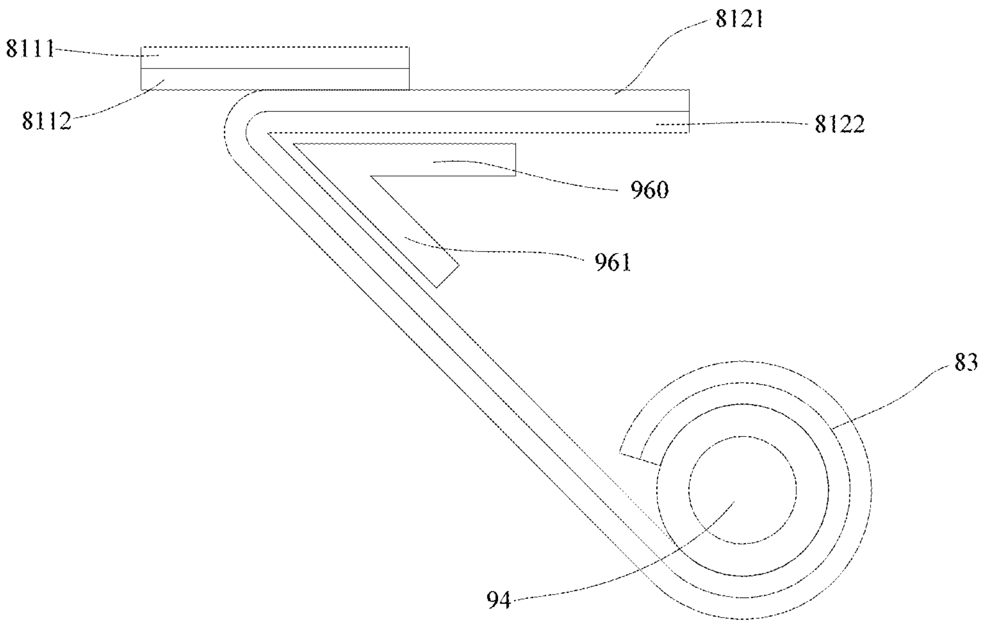
FIG. 34 is a partial enlarged view of the turn-peeling portion of the sticker roll carrier.

In some embodiments, as shown in FIG. 33, the lower plate 92 is further provided with a mounting post 97 at an end distant from the sleeve column 93, where both the mounting post 97 and sleeve column 93 serve to connect with the upper plate 91. The mounting post 97 further includes a pressing-limiting portion 970 positioned relative to the turn-peeling portion 96, with a gap formed between the pressing-limiting portion 970 and the guide structure 961 to allow passage of the liner paper 812. The pressing-limiting portion 970 is disposed between the turn-peeling portion 96 and the winding shaft 94 to maintain a fixed travel direction for the liner paper 812 when passing through the gap, preventing directional deviation that might otherwise occur as the liner paper 812 accumulates and thickens during winding on the winding shaft 94.

Figure 24:
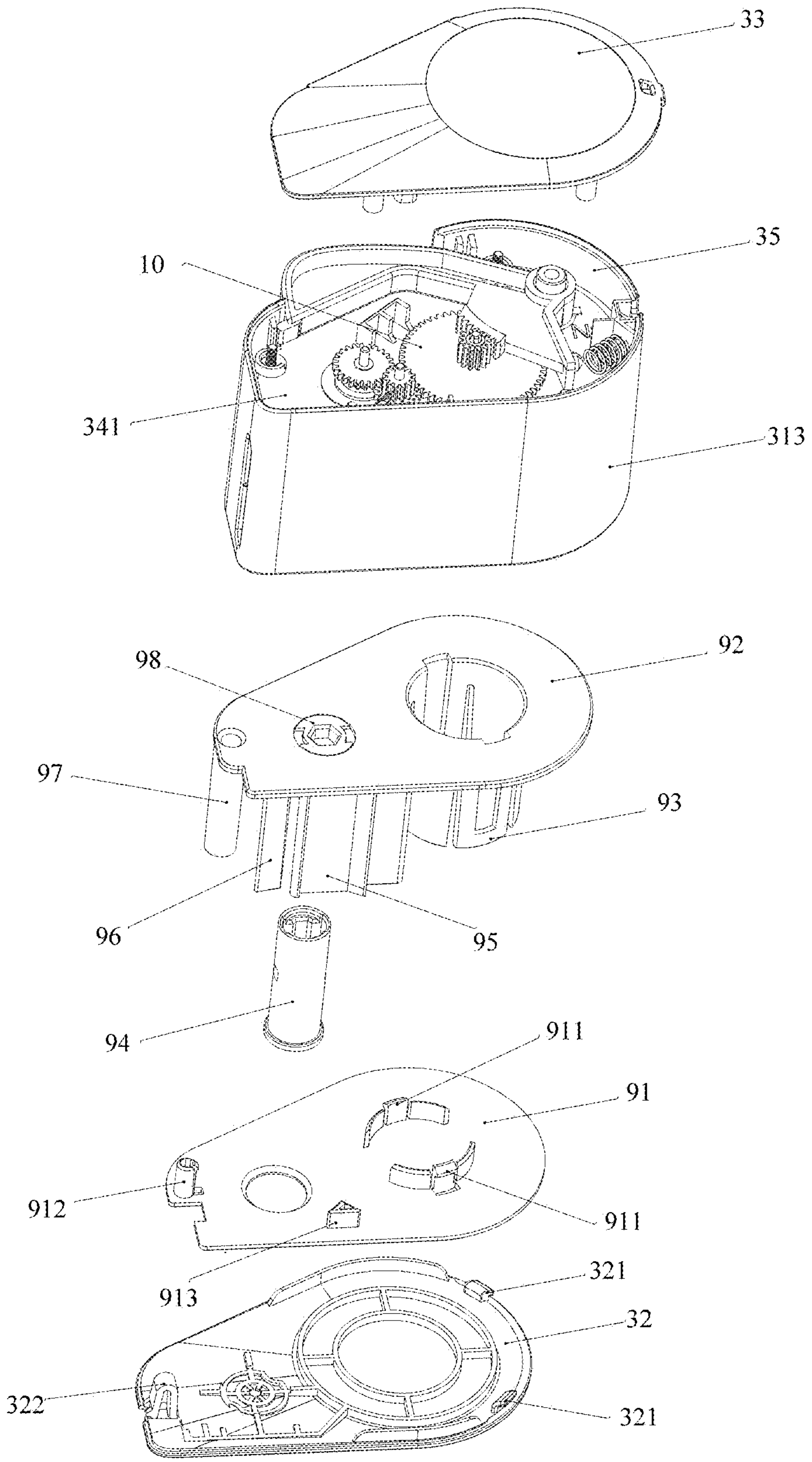
FIG. 24 is a schematic view of the components shown in FIG. 23 at another viewing angle.
Figure 25:
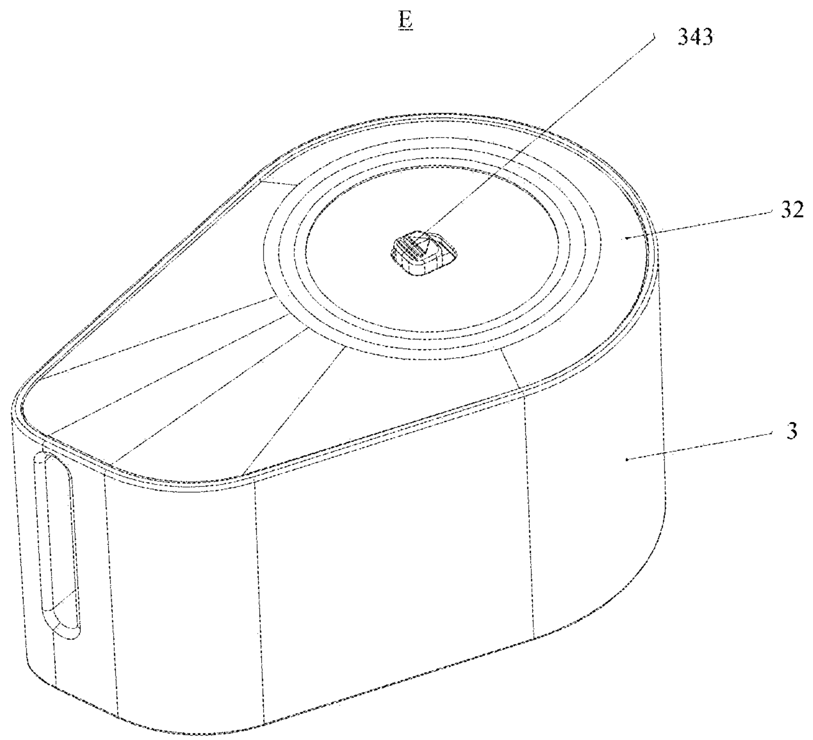
FIG. 25 is a perspective view of another embodiment of the sticker dispenser with sticker roll carrier according to the present disclosure.
Figure 26:
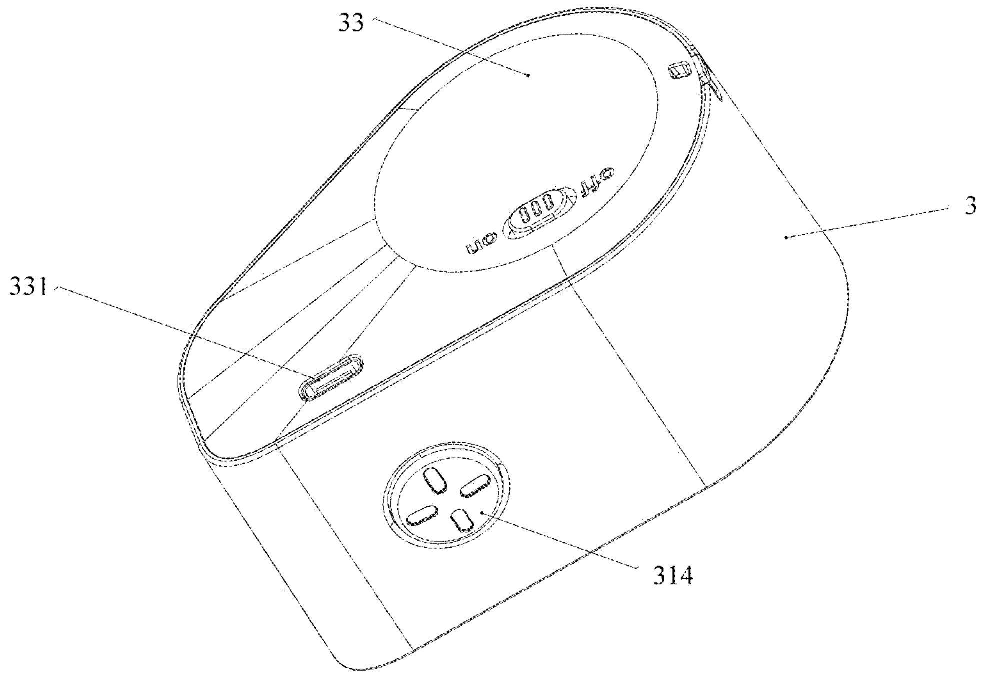
FIG. 26 is a schematic view of the components shown in FIG. 25 at another viewing angle.
Figure 27:
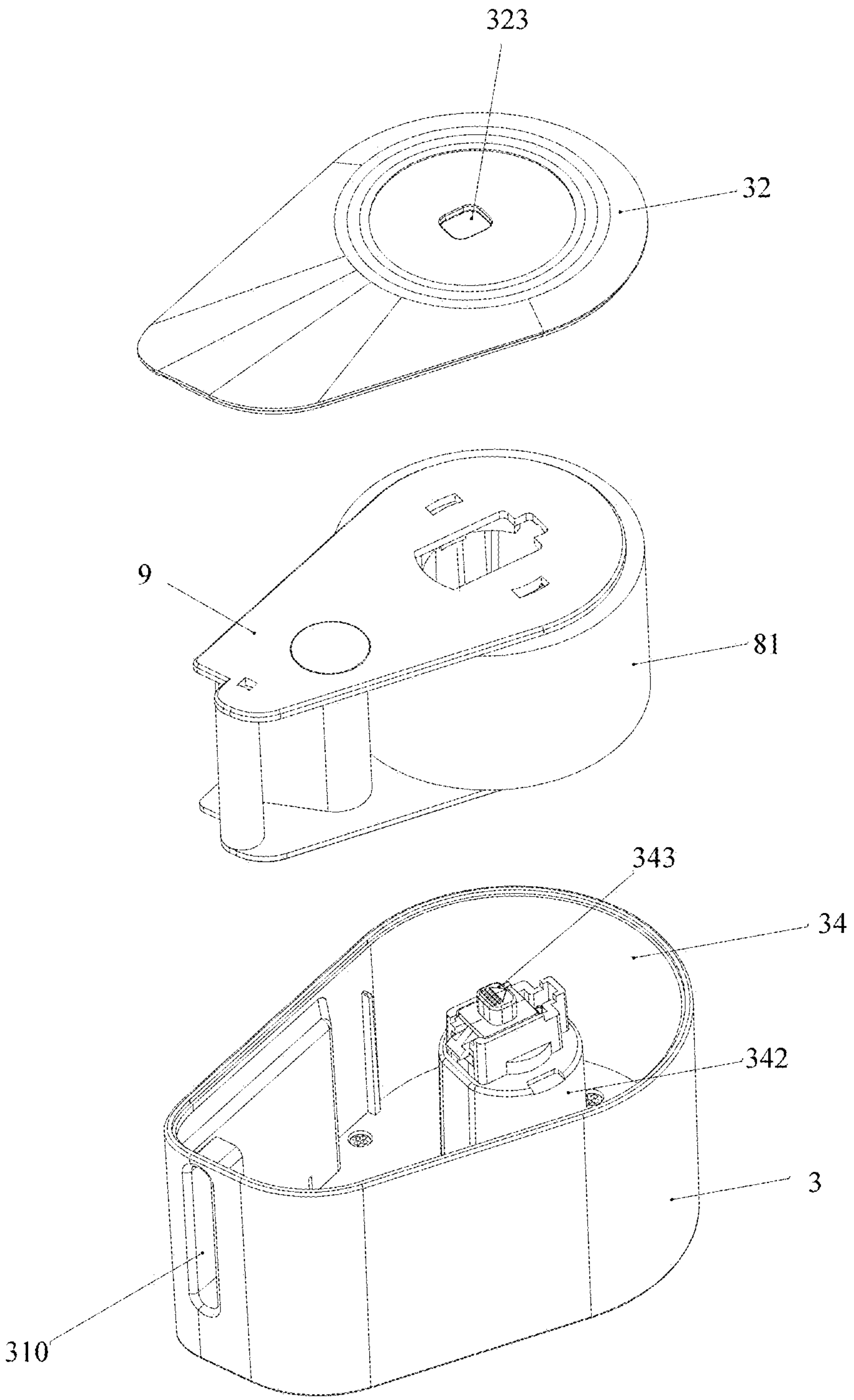
FIG. 27 is a perspective disassembled view of the embodiment shown in FIG. 25 with sticker rolls loaded on the sticker roll carrier.
Figure 28:
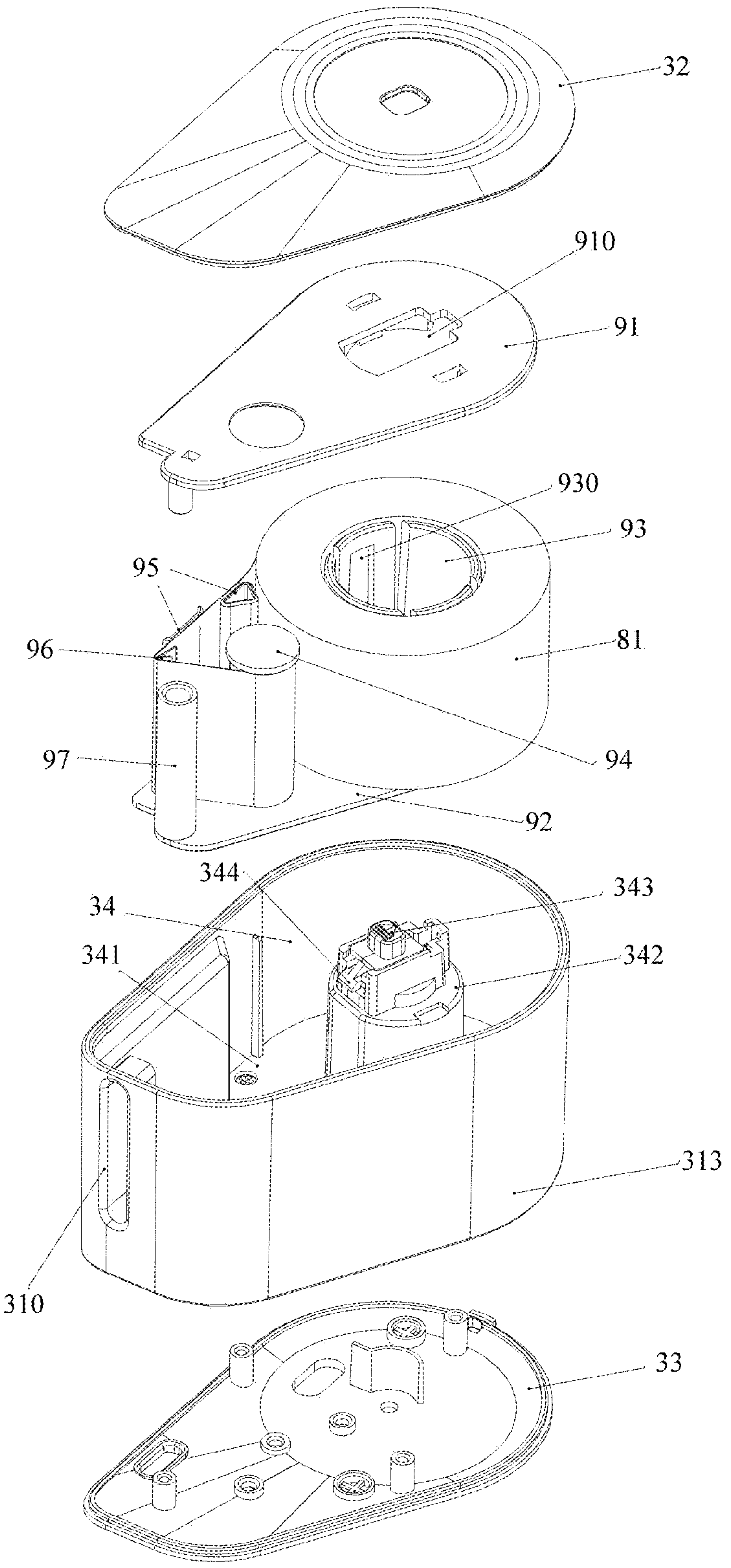
FIG. 28 is a further perspective disassembled view of the embodiment shown in FIG. 25.

Referring to FIG. 24, in some embodiments, the upper plate 91 comprises an engagement hook 911 configured to mate with the snap groove 930, a positioning protrusion 913 designed for insertion into the positioning recess 9501, and a locking post 912 adapted to engage with the mounting post 97. Through the coordinated interaction of these structures, the upper plate 91 becomes securely fastened to the lower plate 92, with the engagement hook 911, positioning protrusion 913, and locking post 912 collectively constituting the mating assembly. In other embodiments, the snap hooks, snap grooves 930, positioning protrusions, or positioning recesses 9501 and their corresponding mating parts may adopt alternative configurations. In some embodiments, these snap hooks, snap grooves 930, positioning protrusions, or positioning recesses 9501 may alternatively be disposed on the turn-peeling portion 96. It is understandable that as long as the sleeve column 93, the winding shaft 94, the sticker conveying section 95, the inner limiting portion 950, the turn-peeling portion 96, the outer limiting portion 960, the guiding structure 961, the mounting column 97, and the pressing-limiting portion 970 are arranged between the upper plate 91 and the lower plate 92, and allow the sticker roll 81 to form a conveying path from the sleeve column 93 to the winding shaft 94 between them, it does not affect the essence of the present disclosure sought to be protected whether the upper plate 91 and the lower plate 92 are separate components, or the upper plate 91 and the lower plate 92 are integrally formed, or all the aforementioned components are separate parts, or any two of the aforementioned components are integrally formed. Similarly, it is understandable that the aforementioned components represent the preferred configuration for this embodiment. Even if some of these components are omitted, as long as the arrangement still enables the sticker roll 81 to form a conveying path from the sleeve column 93 to the winding shaft 94 and allows the release paper 812 and the sticker 811 to begin separating at the peeling point, such variations shall fall within the scope of protection claimed by the present disclosure.

Figure 20:
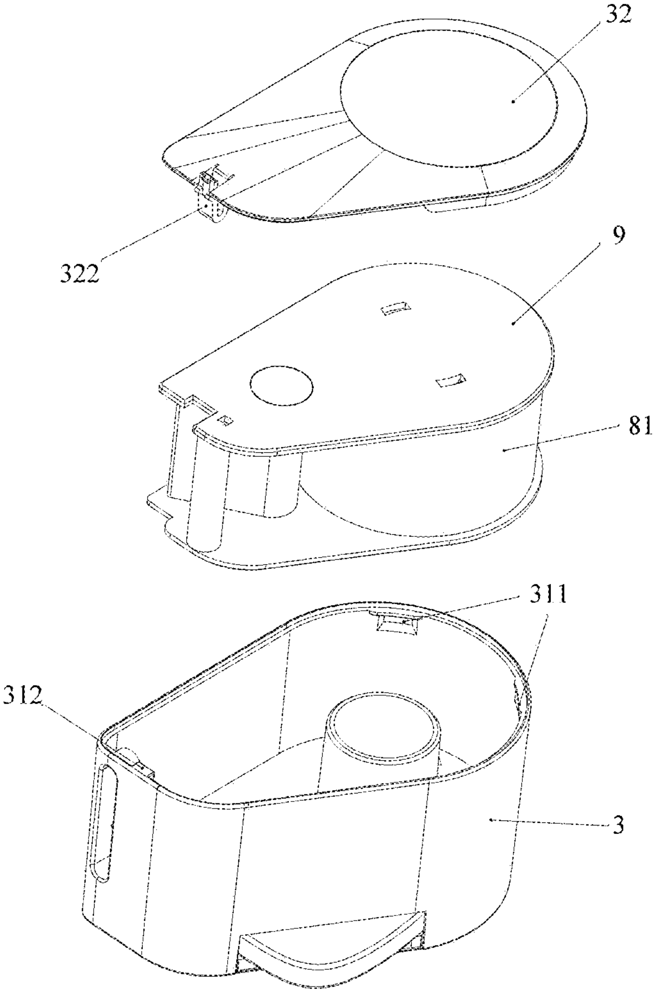
FIG. 20 is a perspective disassembled view of the embodiment in FIG. 19, showing the sticker roll carrier loaded with sticker rolls.
Figure 21:
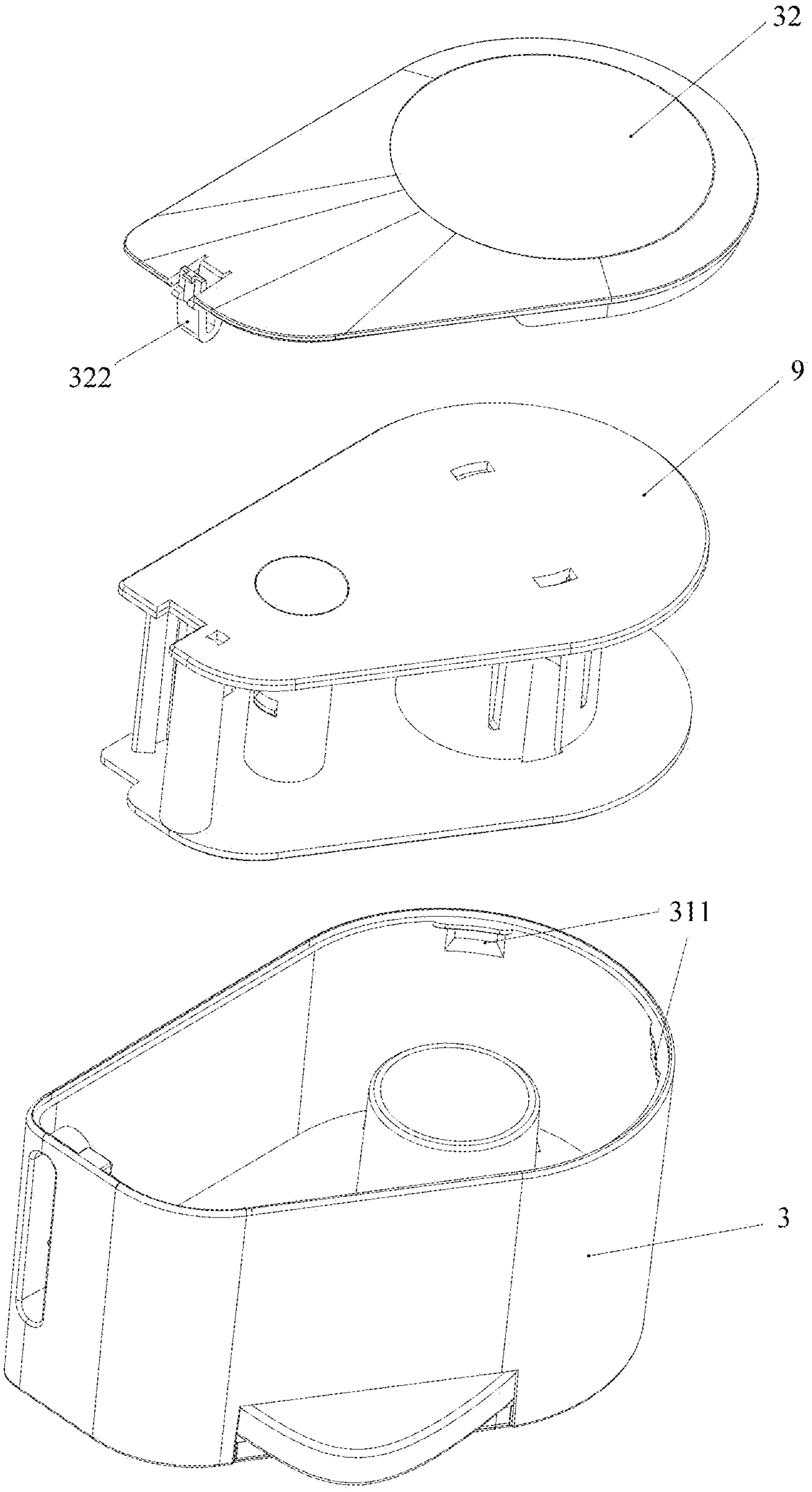
FIG. 21 is a schematic view of the components shown in FIG. 20 with the sticker rolls omitted.
Figure 22:
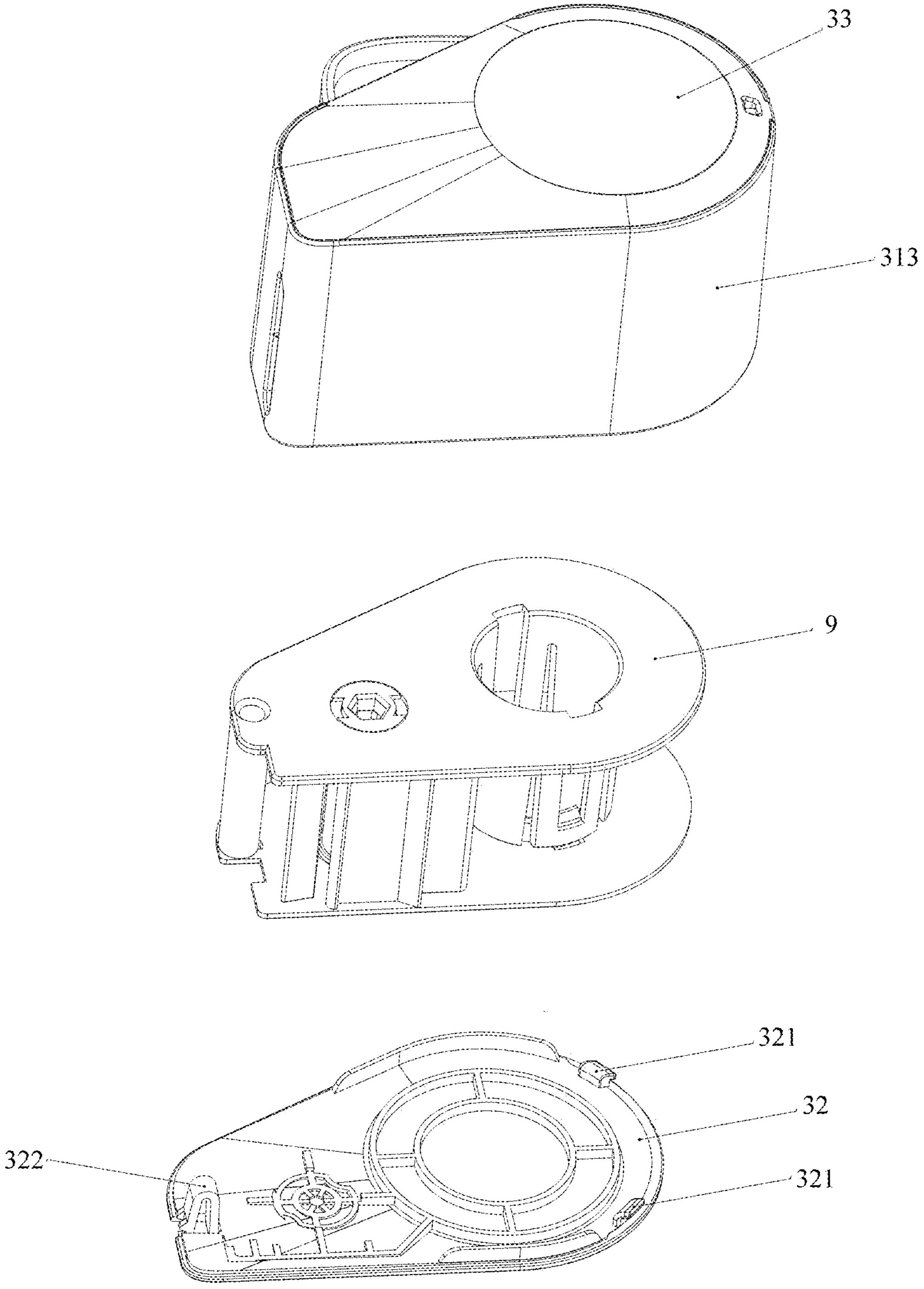
FIG. 22 is a schematic view of the components shown in FIG. 21 at another viewing angle.

Referring to FIGS. 20 to 22, the edges between the upper plate 91 and the lower plate 92 are arranged in an open configuration. The sticker roll 81 sleeved on the sleeve column 93 is restrained by the inner wall of the first chamber 34 within the housing 3 to prevent unwinding. In other words, in this embodiment, only the discretely distributed sleeve column 93, winding shaft 94, sticker conveying section 95, turn-peeling portion 96, and mounting column 97 are provided between the upper plate 91 and the lower plate 92, without any continuous walls. This results in a structurally simple sticker roll carrier 9 with minimal material usage and low cost. Since the sticker roll carrier 9 itself lacks continuous walls and an enclosed chamber, the sticker roll 81 sleeved on the sleeve column 93 relies on the inner wall of the first chamber 34 within the housing 3 to prevent loosening.

Figure 23:
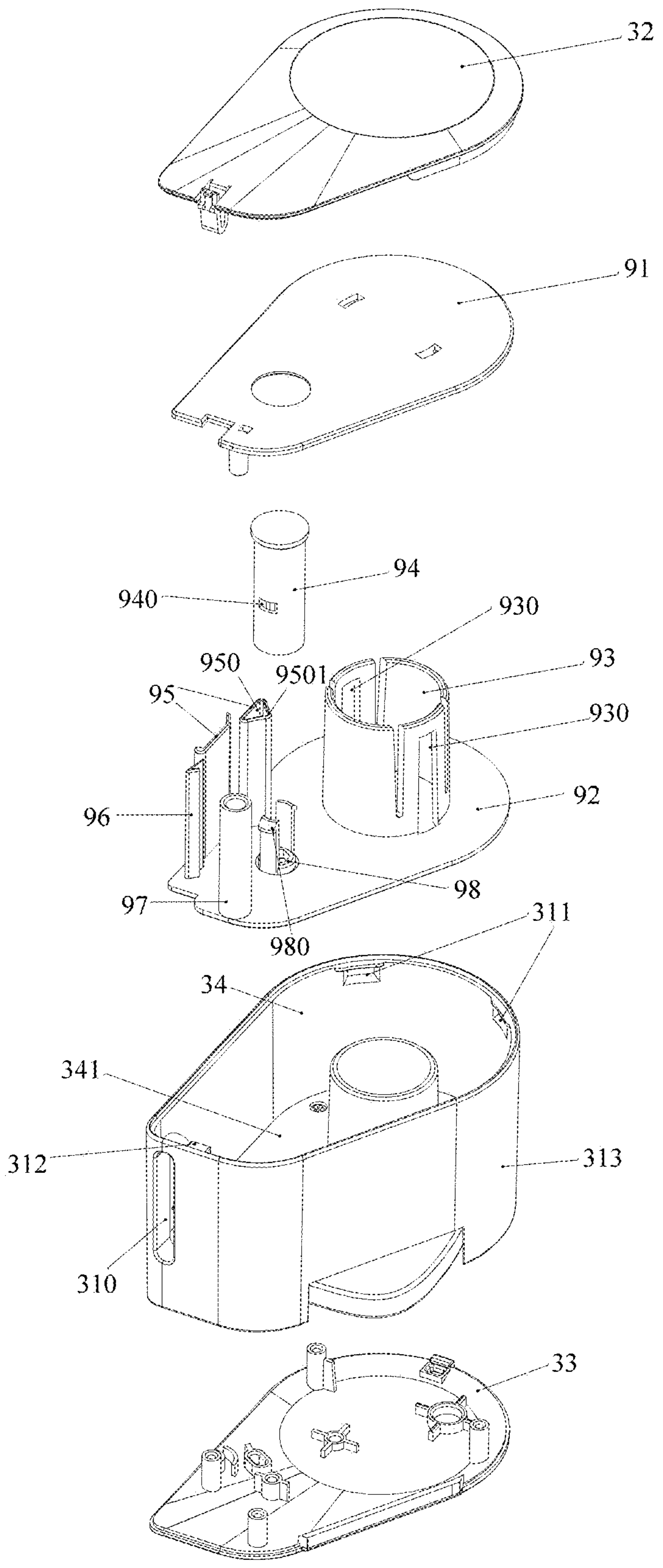
FIG. 23 is a further perspective disassembled view of the embodiment shown in FIG. 19.

Referring further to FIGS. 23 and 24, the winding shaft 94 needs to be rotationally driven by the driving mechanism 10. Therefore, the winding shaft 94 is an independent component rotatably mounted between the upper plate 91 and the lower plate 92. The winding shaft 94 and the housing 3 are equipped with a coupling mechanism that cooperates with each other. The coupling mechanism includes a protruding shaft disposed on one of the winding shaft 94 or the housing 3, and a corresponding shaft sleeve 98 disposed on the other. The driving mechanism 10 transmits power to the winding shaft 94 through the engagement of the protruding shaft and the shaft sleeve 98, thereby driving the winding shaft 94 to rotate and wind the liner paper. In this embodiment, the protruding shaft or shaft sleeve 98 mounted on the winding shaft 94 is connected to the winding shaft 94 via a snap-fit fastener 980. Specifically, the protruding shaft in this embodiment is arranged on the housing 3, while the shaft sleeve 98 is mounted on the winding shaft 94. The shaft sleeve 98 features a polygonal shaft hole exposed below the lower plate 92 and is equipped with a snap-fit fastener 980 that extends upward beyond the lower plate 92. The winding shaft 94 is provided with a corresponding snap-fit hole 940 that engages with the snap-fit fastener 980. The shaft sleeve 98 includes a flange, and its snap-fit fastener 980 passes through from below the lower plate 92 to lock with the winding shaft 94. The flange of the shaft sleeve 98 is constrained against the lower plate 92, collectively ensuring the secure connection of the winding shaft 94. This prevents the winding shaft 94 from tilting away from its own axis, guaranteeing connection reliability.

Referring to FIGS. 20 and 24, the housing 3 includes an insertion positioning portion 311 and a snap-fixing portion 312 respectively disposed on opposite edges of the opening of the first chamber 34. The upper cover 32 is correspondingly provided with an insertion mating portion 321 and an clastic snap-fit portion 322. The upper cover 32 is connected to the housing 3 by means of the insertion mating portion 321 engaging with the insertion positioning portion 311, and the clastic snap-fit portion 322 elastically snapping with the snap-fixing portion 312. In this embodiment, the insertion positioning portion 311 is a slot, the snap-fixing portion 312 is a block, and the insertion mating portion 321 is an insertion sheet.

After the sticker roll carrier 9 is assembled into the first chamber 34 of the housing 3, the insertion mating portion 321 on the upper cover 32 is tilted and inserted into the insertion positioning portion 311 of the housing 3. Then, pressing the end of the upper cover 32 where the clastic snap-fit portion 322 is located causes the clastic snap-fit portion 322 to engage with the snap-fixing portion 312, completing the assembly. For disassembly, pressing the clastic snap-fit portion 322 allows the upper cover 32 to be lifted, enabling the sticker roll carrier 9 inside the first chamber 34 to be removed and replaced. Furthermore, an clastic ejection component may be provided inside the housing 3 to partially eject the sticker roll carrier 9 when the snap engagement between the upper cover 32 and the housing 3 is released, facilitating its removal.

In some embodiments, the housing 3 comprises an outer shell and a lower cover 33. The outer shell includes a peripheral side wall 313 and a partition wall 341, with the peripheral side wall 313 being provided with a output port 310. The partition wall 341 is disposed between the upper and lower edges of the peripheral side wall 313 to enclose a first chamber 34 above the partition wall 341 and a second chamber 35 below the partition wall 341. The second chamber 35 accommodates a driving mechanism 10 for rotating the winding shaft 94, while the lower cover 33 is mounted to cover the lower edge of the peripheral side wall 313.

In some embodiments, the driving mechanism 10 is a manually operated mechanism comprising a toggle lever, a gear set driven by the toggle lever, a clutch, a reset component, and other associated parts. Pressing the toggle lever drives the winding shaft 94 to rotate, thereby winding the liner paper and enabling the peeling of stickers.

Figure 19:
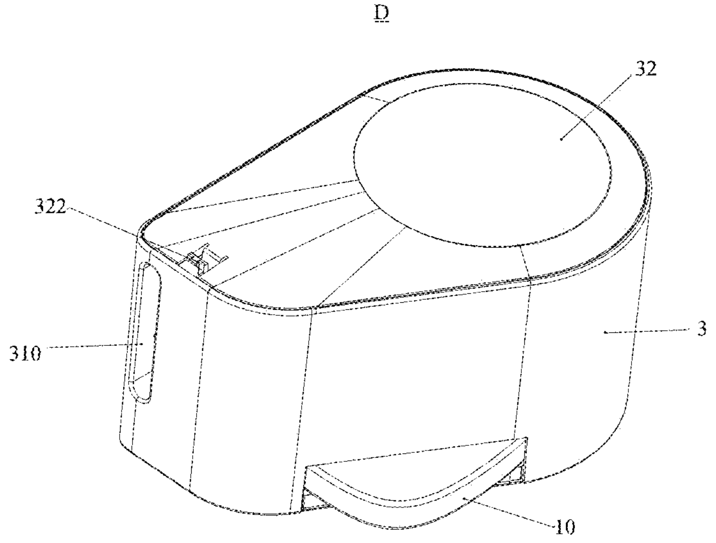
FIG. 19 is a perspective view of a sticker dispenser with a sticker roll carrier according to the embodiment of the present disclosure.

Referring to FIGS. 19 and 24, the present disclosure shows an alternative embodiment of a sticker dispenser D incorporating a sticker roll carrier for dispensing stickers 811. The stickers 811 are detachably adhered to liner paper 812 and wound to form a sticker roll 81. The sticker dispenser comprises a housing 3, a top cover 32, and a sticker roll carrier 9. The housing 3 features the first chamber 34 with an opening. The sticker roll carrier 9 serves to support the sticker roll 81 and is installed within the first chamber 34. The top cover 32 encloses the opening of the first chamber 34 and is detachably attached to the housing 3 to securely maintain the sticker roll carrier 9 within the first chamber 34.

In the sticker dispenser of the present disclosure, the sticker roll carrier 9 does not serve as an exterior surface component but functions solely to support the sticker roll 81 and facilitate sticker 811 dispensing. This design allows for greater material selection flexibility in manufacturing the sticker roll carrier 9 and permits reduced production precision, thereby lowering costs. When the sticker roll 81 is exhausted, users simply need to open the top cover 32, replace the used sticker roll carrier 9 with a new one, and then reclose the top cover 32. As part of the exterior assembly, the top cover 32 remains in permanent use without replacement, minimizing the number of components requiring replacement during sticker roll changes and further reducing operational costs.

Referring to FIGS. 25 to 29, schematic diagrams illustrate another embodiment of a sticker dispenser E with a sticker roll carrier according to the present disclosure. Descriptions of components identical to those in the previous embodiment are omitted. The primary distinction between this embodiment and the aforementioned one lies in the connection structure between the top cover 32 and the housing 3. Specifically, the sticker roll carrier 9 in this embodiment maintains substantially the same overall configuration as its counterpart in the previous embodiment, except for structural modifications to the upper plate 91, which in this version features a through hole 910. In some embodiments, the housing 3 incorporates a positioning post 342 inserted into the sleeve column 93, with the top of the positioning post 342 equipped with an operation button 343 and a snap-fit component 344 controlled by said button. The top cover 32 includes a through hole 323 exposing the operation button 343 and a snap-fit mating component 324 that couples with the snap-fit component 344. For this particular embodiment, the snap-fit mating component 324 comprises a vertically extending retention plate containing a retention groove, where the snap-fit component 344 remains secured within the groove under spring force to maintain engagement, while actuation of the operation button 343 disengages the snap-fit component 344 from the groove to release the connection.

During assembly of the sticker dispenser in this embodiment, first install the sticker roll carrier 9 into the first chamber 34 of the housing 3. Then press the top cover 32 downward onto the opening of the first chamber 34. During this pressing operation, the snap-fit mating component 324 pushes against the sloped surface of the snap-fit component 344, causing it to move laterally and compress the spring. When the retention groove on the snap-fit mating component 324 aligns with the snap-fit component 344, the snap-fit component 344 resets under spring force and engages with the retention groove, thereby securing the top cover 32 in place. For disassembly, actuate the operation button 343 to disengage the snap-fit component 344 from the snap-fit mating component 324, allowing removal of both the top cover 32 and the sticker roll carrier 9 from the first chamber 34. Optionally: an clastic ejection component may be installed within the housing 3 to partially eject the sticker roll carrier 9 when the engagement between the top cover 32 and housing 3 is released, facilitating its removal.

Figure 29:
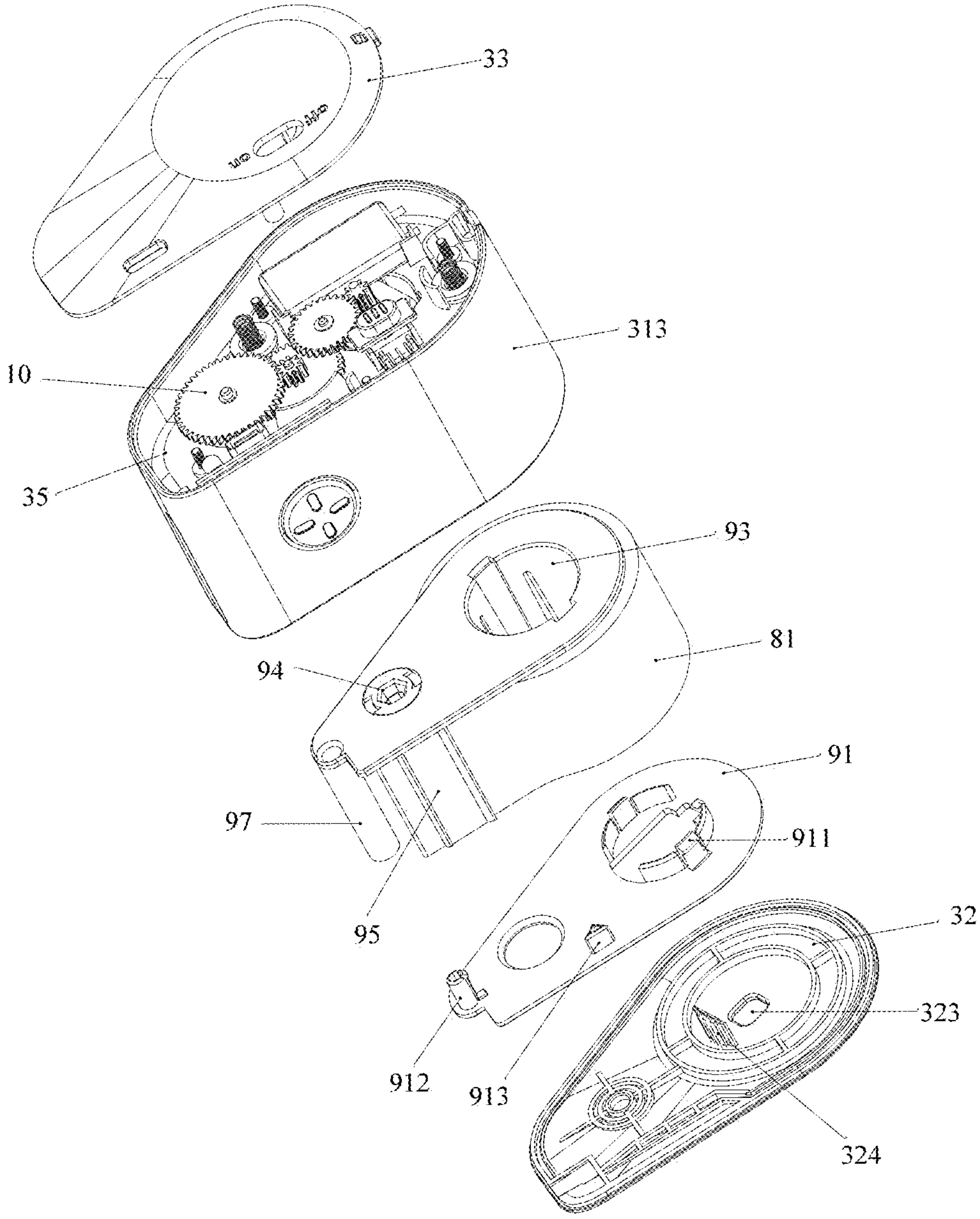
FIG. 29 is a schematic view of the components shown in FIG. 28 at another viewing angle.

Referring to FIG. 29, in some embodiments, the driving mechanism 10 is electrically powered and includes a motor, a battery for powering the motor, a gear set driven by the motor, etc. The main body portion of the motor is housed within the positioning post 342 of the housing 3 to optimize space utilization. In this embodiment, the peripheral side wall 313 of the housing 3 is provided with a control button 314 for activating the motor, while the lower cover 33 features a charging port 331 for recharging the battery. The unmentioned portions of this embodiment are similar to those in the aforementioned embodiments and may be configured by referring to the sticker dispenser D with sticker roll carrier.

Through the description of the preferred embodiments above, it can be understood that the sticker dispenser with a sticker roll carrier provided in the present disclosure comprises a housing 3, a top cover 32, and a sticker roll carrier 9. The sticker roll carrier 9, carrying the sticker roll 81, is assembled within the first chamber 34 of the housing 3. The top cover 32 covers the opening of the first chamber 34 and is detachably connected to the housing 3 to retain the sticker roll carrier 9 within the first chamber 34. This configuration ensures the sticker roll carrier 9 does not serve as an exterior component but functions solely to support the sticker roll 81 and facilitate sticker dispensing. Consequently, the material selection for the sticker roll carrier 9 offers greater flexibility, and its manufacturing precision requirements can be reduced, thereby lowering production costs. When the sticker roll 81 is depleted, users simply need to open the top cover 32, replace the used sticker roll carrier 9 with a new one, and then reclose the top cover 32. As a permanent exterior component, the top cover 32 remains in long-term use without replacement, minimizing the number of components requiring substitution during sticker roll changes and further reducing operational costs.

As mentioned above, the driving mechanism 10 can be either manually-operated or electrically-powered. For the manually-operated mechanism, the unmentioned portions in this embodiment are similar to those in the aforementioned embodiments and may be configured by referring to the manual sticker dispenser A. Regarding the electrically-powered mechanism, the unmentioned portions in this embodiment are similar to those in the previous embodiments and may be set up by referring to the electric sticker dispensers B and C. The identical aspects of the sticker roll carrier 9 across aforementioned embodiments will not be repeatedly described.

It should be noted that the present disclosure is not limited to the above embodiments. According to the creative spirit of the present disclosure, those skilled in the art can also make other modifications, which should not be interpreted as limiting the scope of the present disclosure. It should be noted that all modifications and substitutions equivalent to the embodiment should be included in the scope of the present disclosure. Therefore, the scope of protection of the present disclosure shall be subject to the scope defined in the claims.

What is claimed is:

1. A sticker dispenser with sticker roll carrier for dispensing stickers, the stickers peelably adhered to liner paper and wound into a sticker roll with a central positioning hole, the sticker dispenser comprising:

a housing including a first chamber with an opening;

a sticker roll carrier disposed within the first chamber and configured to carry the sticker roll; and a cover disposed over the opening of the first chamber, and detachably connected to the housing to retain the sticker roll carrier within the first chamber;

wherein the sticker roll carrier comprises an upper plate, a lower plate oppositely disposed to the upper plate, a sleeve column configured for mounting the sticker roll and disposed between the upper plate and the lower plate, and a winding shaft disposed between the upper plate and the lower plate and adapted to wind the liner paper after sticker separation;

wherein the sleeve column is a hollow cylinder, and the housing includes a positioning post inserted into the sleeve column;

wherein a top end of the positioning post comprises an operation button and a snap-fit component actuated by the operation button, and the cover comprises a through hole for exposing the operation button and a snap-fit mating component that couples with the snap-fit component.

2. A sticker dispenser with sticker roll carrier for dispensing stickers, the stickers peelably adhered to liner paper and wound into a sticker roll with a central positioning hole, the sticker dispenser comprising:

a housing including a first chamber with an opening;

a sticker roll carrier disposed within the first chamber and configured to carry the sticker roll; and a cover disposed over the opening of the first chamber, and detachably connected to the housing to retain the sticker roll carrier within the first chamber;

wherein the sticker roll carrier comprises an upper plate, a lower plate oppositely disposed to the upper plate, a sleeve column configured for mounting the sticker roll and disposed between the upper plate and the lower plate, and a winding shaft disposed between the upper plate and the lower plate and adapted to wind the liner paper after sticker separation;

wherein the winding shaft and the housing are provided with mutually engaged coupling mechanism, the coupling mechanism comprises a protruding shaft disposed on one of the winding shaft or the housing and a shaft sleeve disposed on the other;

wherein the protruding shaft or shaft sleeve mounted on the winding shaft is connected thereto via a snap-fit fastener;

wherein the housing comprises an outer shell and a base cover, and the outer shell comprises a peripheral side wall and a partition wall disposed between upper and lower edges of the peripheral side wall to form the first chamber above the partition wall and a second chamber below the partition wall;

wherein the second chamber accommodates a driving mechanism for rotating the winding shaft, and the base cover is mounted to cover the lower edge of the peripheral side wall.

3. The sticker dispenser with sticker roll carrier of claim 2, wherein the driving mechanism is a manually-operated mechanism, comprising:

an operating member, configured to operatively reciprocate between a first position and a second position; and a transmitting mechanism, transmission-connected to the operating member and the winding shaft, being capable of transmitting power output from the operating member to the winding shaft to drive the winding shaft to rotate;

wherein the transmitting mechanism comprises a one-way clutching device, coupled in condition of the operating member moving in a first direction to implement a transmission of the power, and uncoupled in condition of the operating member moving in a second direction opposite to the first direction to disconnect the transmission of the power.

4. The sticker dispenser with sticker roll carrier of claim 3, wherein the transmitting mechanism is a gear train transmitting mechanism comprising a plurality of gears coupled to each other, the one-way clutch device comprises:

a movable gear, configured to be movable between a coupled position and a detached position; and a force-applying member, applying a resilient force to the movable gear towards the coupled position;

wherein in condition of the operating member moving in the second direction to reset from the second position to the first position, the movable gear moves from the coupled position to the detached position due to the movement of the operating member in the second direction overcoming the resilient force.

5. The sticker dispenser with sticker roll carrier of claim 3, wherein the transmitting mechanism is a gear train transmitting mechanism formed by multiple intermeshing gears, the one-way clutch device comprises:

a movable gear, configured to be movable between a coupled position and a detached position; and a force-applying member, configured to apply elastic force to the movable gear in a direction maintaining the coupled position;

wherein in condition of the operating member moving in the first direction to move from the first position to the second position, the movable gear moves from the detached position to the coupled position, driven by the resilient force of the force-applying member.

6. The sticker dispenser with sticker roll carrier of claim 4, wherein at least one wall of the second chamber is provided with guide slots for guiding the movement path of the movable gear when it moves between the coupled position and the detached position.

7. The sticker dispenser with sticker roll carrier of claim 4, wherein the transmitting mechanism comprises:

an actuating gear, positioned upstream of and permanently coupled with the movable gear in the power transmission direction; and a driven gear, positioned downstream of and separably coupled with the movable gear in the power transmission direction;

wherein when the operating member moves along the second direction, the actuating gear acts upon the movable gear to separate it from the driven gear.

8. The sticker dispenser with sticker roll carrier of claim 3, wherein a reset spring is attached to the operating member and configured to apply force to the operating member in the second direction of movement.

9. The sticker dispenser with sticker roll carrier of claim 2, wherein the driving mechanism, being an electric driving mechanism, comprises:

an electric motor that outputs rotational power and is transmission-connected to the winding shaft;

wherein at least a portion of the electric motor is disposed within the first chamber and adapted to extend through the central positioning hole of the sticker roll.

10. The sticker dispenser with sticker roll carrier of claim 9, wherein the housing comprises an extension cover protruding into the first chamber, with at least a portion of the electric motor being disposed within the extension cover.

11. The sticker dispenser with sticker roll carrier of claim 10, wherein the extension cover is configured to extend through the central positioning hole so as to position the sticker roll.

12. The sticker dispenser with sticker roll carrier of claim 11, wherein the extension cover has an accommodation configured to form a pickup space between itself and the wall surface of the central positioning hole, allowing the sticker roll to be gripped and removed from the pickup space.

13. The sticker dispenser with sticker roll carrier of claim 12, wherein the electric motor has a positioning portion corresponding to the accommodation for cooperating with the accommodation to circumferentially fix the electric motor relative to the extension cover.

14. The sticker dispenser with sticker roll carrier of claim 3, further comprising:

an optical-electronic device, disposed adjacent to the output port and configured to acquire sticker output information based on photoelectric signals; and a light-shielding portion, arranged to prevent external light interference with photoelectric signals by blocking external light from entering the optical-electronic device through the output port.

* * * * *